(12) United States Patent
De Angelo

(10) Patent No.: US 7,702,682 B2
(45) Date of Patent: Apr. 20, 2010

(54) SYSTEM AND METHOD FOR CREATING AND MANIPULATING INFORMATION CONTAINERS WITH DYNAMIC REGISTERS

(75) Inventor: Michael De Angelo, Palm Springs, CA (US)

(73) Assignee: Incandescent, Inc., San Rafael, CA (US)

( * ) Notice: Subject to any disclaimer, the term of this patent is extended or adjusted under 35 U.S.C. 154(b) by 579 days.

(21) Appl. No.: 11/280,700

(22) Filed: Nov. 14, 2005

(65) Prior Publication Data

US 2006/0122987 A1    Jun. 8, 2006

Related U.S. Application Data

(63) Continuation of application No. 09/284,113, filed as application No. PCT/US99/01988 on Jan. 28, 1999, now Pat. No. 7,010,536.

(60) Provisional application No. 60/073,209, filed on Jan. 30, 1998.

(51) Int. Cl.
   *G06F 17/30* (2006.01)
(52) U.S. Cl. ...................... 707/758; 707/768
(58) Field of Classification Search ................ 707/751, 707/755, 758, 768
   See application file for complete search history.

(56) References Cited

U.S. PATENT DOCUMENTS

| | | | |
|---|---|---|---|
| 5,493,677 A * | 2/1996 | Balogh et al. ............ 707/104.1 |
| 5,664,208 A | 9/1997 | Pavley et al. |
| 5,768,510 A | 6/1998 | Gish |
| 5,815,665 A | 9/1998 | Teper et al. |
| 5,848,246 A | 12/1998 | Gish |
| 5,862,223 A * | 1/1999 | Walker et al. ................ 705/50 |
| 5,924,090 A * | 7/1999 | Krellenstein ................... 707/5 |
| 5,987,480 A * | 11/1999 | Donohue et al. ............ 715/207 |
| 6,014,647 A * | 1/2000 | Nizzari et al. ................ 705/39 |
| 6,016,495 A | 1/2000 | McKeehan et al. |
| 6,075,791 A | 6/2000 | Chiussi et al. |
| 6,154,782 A | 11/2000 | Kawaguchi et al. |
| 6,173,280 B1 | 1/2001 | Ramkumar et al. |
| 6,198,738 B1 | 3/2001 | Chang et al. |
| 6,351,745 B1 | 2/2002 | Itakura et al. |
| 6,725,251 B2 * | 4/2004 | Ito et al. ...................... 709/203 |

FOREIGN PATENT DOCUMENTS

| WO | WO 98/02831 | 1/1998 |
|---|---|---|
| WO | WO 99/39285 | 8/1999 |

\* cited by examiner

*Primary Examiner*—Cam-Linh Nguyen
(74) *Attorney, Agent, or Firm*—Orrick, Herrington & Sutcliffe LLP

(57) ABSTRACT

A search query may be run against a plurality of container registers encapsulated and logically defined in a plurality of containers to identify one or more container registers responsive to the search query. Thereafter, a list characterizing the identified containers may be provided. Related methods, apparatus, computer program products, and computer systems are also described.

23 Claims, 30 Drawing Sheets

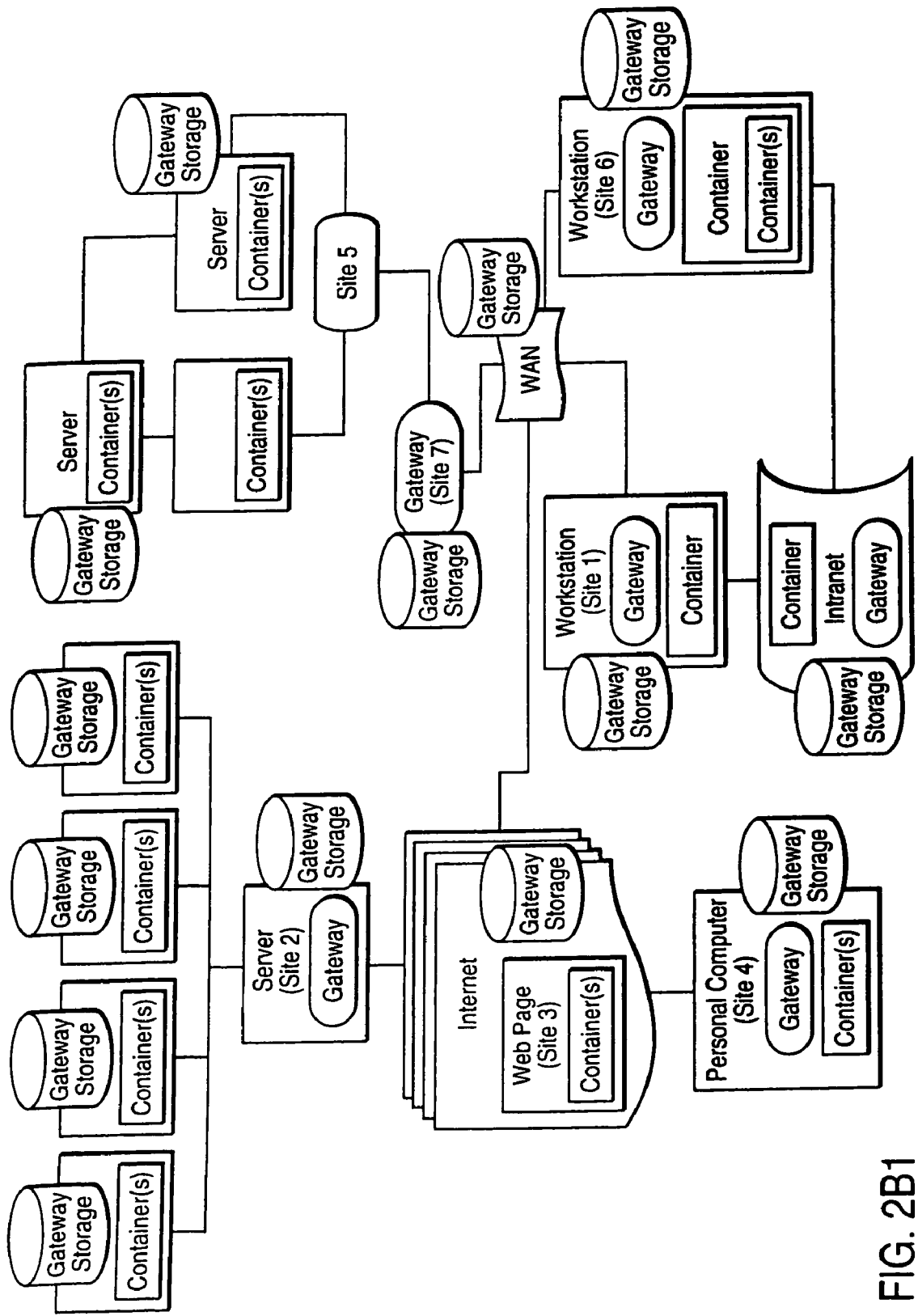
FIG. 2B1

SYSTEM AND METHOD FOR CREATING AND MANIPULATING INFORMATION CONTAINERS WITH DYNAMIC REGISTERS

CROSS-REFERENCE TO RELATED APPLICATIONS

The present application is a continuation of U.S. patent application Ser. No. 09/284,113, entitled System And Method For Creating And Manipulating Information Containers With Dynamic Registers, filed on Apr. 7, 1999, now U.S. Pat. No. 7,010,536 which is incorporated herein in its entirety, and claims the benefit of PCT/US99/01988 filed Jan. 28, 1999 and of U.S. Patent Application No. 60/073,209, filed Jan. 30, 1998.

BACKGROUND OF THE INVENTION

1. Field of the Invention

The present invention relates generally to computer systems in a multi-user mainframe or mini computer system, a client server network, or in local, wide area or public networks, and in particular, to computer networks for creating and manipulating information containers with dynamic interactive registers in a computer, media or publishing network, in order to manufacture information on, upgrade the utility of, and develop intelligence in, a computer network by offering the means to create and manipulate information containers with dynamic registers.

2. Description of the Related Art

In the present day, querying and usage of information resources on a computer network is accomplished by individuals directing a search effort by submitting key words or phrases to be compared to those key words or phrases contained in the content or description of that information resource, with indices and contents residing in a fixed location unchanging except by human input. Similarly, the class of storage medium upon which information resides, it class and subclass organizational structures, and its routes of access all remain fundamentally unaltered by ongoing user queries and usage. Only the direct and intended intervention of the owner of the information content or computer hosting site changes these parameters, normally accomplished manually by programmers or systems operators at their own discretion or the discretion of the site owner.

There exists currently in the art a limited means of interfacing a computer user with the information available on computer networks such as the world wide web. Primarily, these means are search engines. Search engines query thousands or tens of thousands of index pages per second to suggest the location of information while the user waits. While factual information can be accessed, the more complex, particular or subtle the inquiry, the more branches and sub-branches need to be explored in a time consuming fashion in order to have any chance of success. Further, there are no such automatic devices that reconstruct the information into more useful groupings or makes it more accessible according to factors attached to the content by the content creator such as the space or time relevancy of its content, or factors attached to the content by the system's compilation and analysis of the accumulated biography of that specific content's readership.

The utility of wide area and public computer networks is thus greatly limited by the static information model and infrastructure upon which those networks operate.

One problem is that on a wide area or public network, specific content such as a document remains inert, except by the direct intervention of users, and is modified neither by patterns or history of usage on the network, or the existence of other content on the network.

Another problem is that content does not reside in an information infrastructure conducive to reconstruction by expert rule-based, fuzzy logic, or artificial intelligence based systems. Neither the intelligence of other information users nor the expert intelligence of an observant network computer system can be utilized in constructing, or re-constructing information resources. Where content resides in a fixed location and structure, "information" becomes something defined by the mind of the information provider rather than the mind of the information user, where the actual construction and utility of information exists. Information remains, like raw ore, in an unrefined state.

Another problem is that the class of storage medium upon which data resides cannot be system or user managed and altered according to the actual recorded and analyzed hierarchically graded usage of any given information resource residing on that storage medium except by statistical analysis of universal, undefined "hits" or visits to that page or site.

Another problem is that information resource groupings remain fixed on the given storage medium location according to the original installation by the resource author, not altered according to the actual recorded and analyzed hierarchically graded usage of that given information resource. Content itself remains inert, with no possibility of evolution.

A further problem with the prior art is that neither the search templates generated by those more knowledgeable in a given field of inquiry, nor the search strategies historically determined to be successful, or system-constructed according to analyses of search strategies historically determined to be successful, are available to inquiring users. A search template is here defined as one or more text phrases, graphics, video or audio bits, alone or in any defined outline or relational format designed to accomplish an inquiry. Internet or wide area network search may return dozens of briefs to a keyword or key phrase inquiry sometimes requiring the time-consuming examination of multiple information resources or locations, with no historical relation to the success of any given search strategy.

A further problem is that there is limited means to add to, subtract from, or alter the information content of documents, databases, or sites without communicating with the owners or operators of those information resources, e.g., contacting, obtaining permission, negotiating and manually altering, adding or subtracting content. Additionally, once so altered, there is not a means to derive a proportionate value, and thereby a proportionate royalty as the information is used.

A final problem is that the physical residence of a body of data or its cyberspace location may not serve its largest body of users in the most expedient manner of access. Neither the expert intelligence of other information users nor the expert intelligence of an observant computer system is presently utilized by inherent network intelligence to analyze, re-design and construct access routes to information medium except by statistical analysis of universal, undefined "hits" or visits to that page or site.

Therefore, there is a need for a system and methods for creating and manipulating information containers with dynamic interactive registers defining more comprehensive information about contained content in a computer, media or publishing network, in order to manufacture information on, upgrade the utility of, and develop intelligence in, a computer network by providing a searching user the means to utilize the searches of other users or the historically determined and compiled searches of the system, a means to containerize information with multiple registers governing the interaction of that container, a means to re-classify the storage medium and location of information resources resident on the network, a means to allow the reconstruction of content into more useful formations, and a means to reconstruct the access routes to that information.

SUMMARY OF THE INVENTION

The present invention is a system and methods for manufacturing information on, upgrading the utility of, and developing intelligence in, a computer or digital network, local, wide area, public, corporate, or digital-based, supported, or enhanced physical media form or public or published media, or other by offering the means to create and manipulate information containers with dynamic registers.

The system of the present invention comprises an input device, an output device, a processor, a memory unit, a data storage device, and a means of communicating with other computers, network of computers, or digital-based, supported or enhanced physical media forms or public or published media. These components are preferably coupled by a bus and configured for multi-media presentation, but may also be distributed throughout a network according to the requirements of highest and best use.

The memory unit advantageously includes an information container made interactive with dynamic registers, a container editor, a search interface, a search engine, a search engine editor, system-wide hierarchical container gateways interacting with dynamic container registers, a gateway editor, a register editor, a data collection means with editor, a data reporting means with editor, an analysis engine with editor, an executing engine with editor, databases, and a means of communicating with other computers as above. These components may reside in a distributed fashion in any configuration on multiple computer systems or networks.

The present invention advantageously provides a container editor for creating containers, containerizing storing information in containers and defining and altering container registers. A container is an interactive nestable logical domain configurable as both subset and superset, including a minimum set of attributes coded into dynamic interactive evolving registers, containing any information component, digital code, file, search string, set, database, network, event or process, and maintaining a unique network-wide lifelong identity.

The container editor allows the authoring user to create containers and encapsulate any information component in a container with registers, establishing a unique network lifelong identity, characteristics, and parameters and rules of interaction. The authoring user defines and sets the register with a starting counter and/or mathematical description by utilizing menus and simple graphing tools or other tools appropriate to that particular register. The registers determine the interaction of that container with other containers, system components, system gateways, events and processes on the computer network.

Containers and registers, upon creation, may be universal or class-specific. The editor provides the means to create system-defined registers as well as the means to create other registers. The editor enables the register values to be set by the user or by the system, in which case the register value may be fixed or alterable by the user upon creation. Register values are evolving or non-evolving for the duration of the life of the container on the system. Evolving registers may change through time, space, interaction, system history and other means.

System-defined registers comprise: (1) an historical container register, logging the history of the interaction of that container with other containers, events and processes on the network, (2) an historical system register, logging the history of pertinent critical and processes on the network, (3) a point register accumulating points based upon a hierarchically rated history of usage, (4) an identity register maintaining a unique network wide identification and access location for a given container, (5) a brokerage register maintaining a record of ownership percentage and economic values, and others.

The present invention also includes user-defined registers. User defined registers may be created wholly by the user and assigned a starting value, or simply assigned value by the user when that register is pre-existent in the system or acquired from another user, and then appended to any information container, or detached from any container.

Exemplary user-defined registers comprise (1) a report register, setting trigger levels for report sequences, content determination and delivery target, (2) a triple time register, consisting of a range, map, graph, list, curve or other representation designating time relevance, actively, assigning the time characteristics by which that container will act upon another container or process, passively, assigning the time characteristics by which that container be acted upon by another container or process, and neutrally, assigning the time characteristics by which that container will interact with another container or process, (3) a triple space register, consisting of a range, map, graph, list, curve or other representation designating the domain and determinants of space relevance, actively, assigning the space characteristics by which that content will act upon another container or process, passively, assigning the space, characteristics by which that content will be acted upon by another container or process, and neutrally, assigning the space characteristics by which that container will interact with another container or process, (4) a domain of influence register, determining the set, class and range of containers upon which that container will act, (5) a domain of receptivity register, determining the set, class and range of containers allowed to act upon that container, (6) a domain of neutrality register, determining the set, class and range of containers with which that container will interact, (7) a domain of containment register, determining the set, class and range of containers which that container may logically encompass, (8) a domain of inclusion register, determining the set, class and range of containers by which that container might be encompassed, (9) an ownership register, recording the original ownership of that containers, (10) a proportionate ownership register, determining the proportionate ownership of that containers, (11) a creator profile register, describing the creator or creators of that container, (12) an ownership address register, maintaining the address of the creator or creators of that container, (13) a value register, assigning a monetary or credit value to that container, and (14) other registers created by users or the system.

Containers are nestable and configurable as both subset and superset and may be designated hierarchically according to inclusive range, such as image component, image, image file, image collection, image database, or if text, text fragment, sentence, paragraph, page, document, document collection, document, database, document library, or any arrangement wherein containers are defined as increasingly inclusive sets of sets of digital components.

The present invention also includes, structurally integrated into each container, or strategically placed within a network at container transit points, unique gateways, nestable in a hierarchical or set and class network scheme. Gateways gather and store container register information according to system-defined, system-generated, or user determined rules as containers exit and enter one another, governing how containers system processes or system components interact within the domain of that container, or after exiting and entering that container, and governing how containers, system components and system processes interact with that unique gateway, including how data collection and reporting is managed at that gateway. The gateways record the register information of internally nested sub and superset containers, transient containers and search templates, including the grade of access requested, and, acting as an agent of an analysis engine and execution engine, govern the traffic and interaction of those containers and searches with the information resource of which they are the gateway and other gateways. The gateways' record of internally nested and transient container registers, and its own interaction with those containers, is made available, according to a rules-based determination, to the process of the analysis engine by the data collection and/or data reporting means.

The present invention also includes a means of data storage at any given gateway.

The present invention also includes a data collection means, residing anywhere on the network, or located at one or more hierarchical levels of nestable container gateways for gathering information from other gateways and analysis engines according to system, system-generated or user determined rules. The data collection means manages the gathering of data regarding network-wide user choices, usage and information about information, by collecting it from container and gateway registers as those containers and gateways pass through one another. Such statistics as frequency, pattern, and range of time, space and logical class is collected as directed by the analysis engine, and made that data available to the analysis engine by advancing it directly to the analysis engine, or incrementally, to the next greater hierarchically inclusive collection level. The rules of data collection may be manually set or altered by the system manager, or set by the system and altered by the system in its evolutionary capacity.

The present invention also includes a data reporting means, located at one or more hierarchical levels of nestable container gateways for submitting information to other gateways and analysis engines according to system, system-generated or user determined rules. The data reporting means manages the sending of data from the registers, gateways and search templates in a frequency, pattern, and range of time, space and logical class as directed by the analysis engine, and makes that data available to the analysis engine by advancing it directly to the analysis engine, or incrementally to the next greater hierarchically inclusive reporting level. The rules of data collection may be manually set or altered by the system manager, or set by the system and altered by the system in its evolutionary capacity. The data reporting means may be established to work in concert, in redundancy, or in contiguous or interwoven threads of hierarchically nested containers.

The present invention also includes an analysis engine that receives, reports and collects information regarding the interaction of user searches with gateways and container registers, as well as container registers with other container registers, and container registers with gateways. The analysis engine analyzes the information submitted by the gateways and instructs the execution engine to create new information containers, content assemblages, storage schemes, access routes, search templates, and gateway instructions. The analysis engine includes an editor that provides a system manager with a means of editing the operating principles of that engine, governing data reporting, data collection, search template loading, gateway instructions, and other.

The present invention also includes an execution engine, fulfilling the instructions of the analysis engine, to create new information containers, content sun and superset assemblages, storage schemes, access routes, search templates, and gateway instructions. The execution engine includes an editor that provides a system manager with a means of editing the operating principles of that engine, governing data reporting, data collection, search template loading, gateway instructions, and other.

The present invention also includes a search interface or browser. The search interface provides a means for a searching user to submit, record and access search streams or phrases generated historically by himself, other users, or the system. Search streams or phrases of other users are those that have been historically determined by the system to have the highest probability of utility to the searching user. Search streams or phrases generated by the system are those that have been constructed by the system through the analysis engine based upon the same criteria.

BRIEF DESCRIPTION OF THE DRAWINGS

FIG. 2B1 is an exemplary embodiment of a computer network showing computer servers, personal computers, workstations, Internet, Wide Area Networks, Intranets in relationship with containers and gateways and exemplary locations of gateway storage in proximity to one or more of the various sites.

DESCRIPTION OF THE PREFERRED EMBODIMENT

The System

Figure 1:
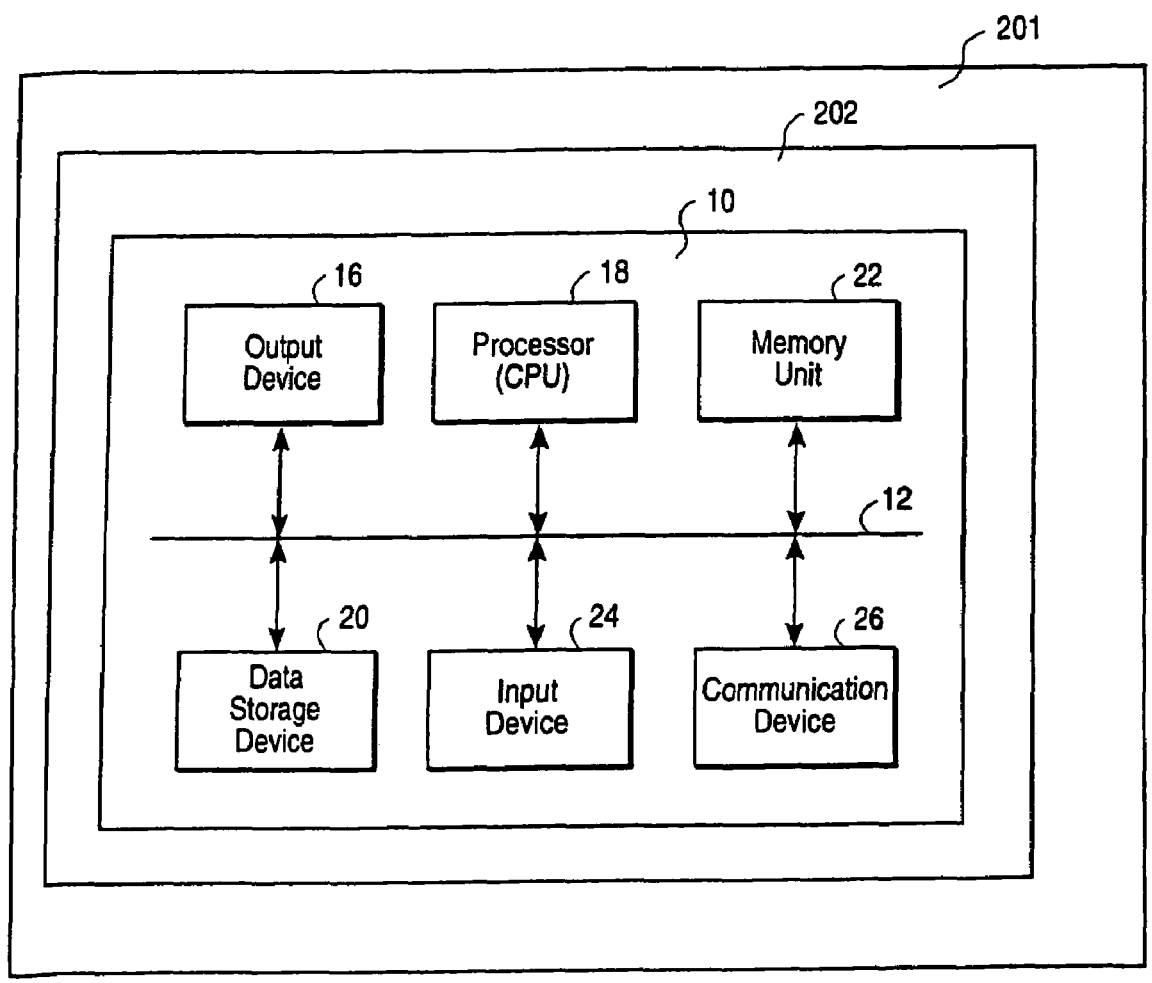
FIG. 1 is a block diagram of a first and preferred embodiment of a system constructed according to the present invention.

Referring now to FIG. 1, a preferred embodiment of a system 10 for creating and manipulating information containers with dynamic interactive registers in a computer, media, or publishing network 201 in order to manufacture information on, upgrade the utility of, and develop intelligence in that network 201, is shown. The system 10 preferably comprises an input device 24, an output device 16, a processor 18, a memory unit 22, a data storage device 20, and a communication device 26 operating on a network 201. The input device 24, an output device 16, a processor 18, a memory unit 22, a data storage device 20, are preferably coupled together by a bus 12 in a von Neumann architecture. Those skilled in the art will realize that these components 24, 16, 18, 22, 20, and 26 may be coupled together according to various other computer architectures including any physical distribution of components linked together by the communication device 26 without departing from the spirit or scope of the present invention, and may be infinitely nested or chained, both as computer systems within a network 202, and as networks within networks 201.

The output device 16 preferably comprises a computer monitor for displaying high-resolution graphics and speakers for outputting high fidelity audio signals. The output device 16 is used to display various user interfaces 110, 125, 210, 300, 510, 610, 710, as will be described below, for searching for and containerizing information, and editing the container gateways, containers, container registers, the data reporting means and the data collection means, and the search, analysis and execution engines. The author uses the input device 24 to manipulate icons, text, charts or graphs, or to select objects or text, in the process of packaging, searching or editing in a conventional manner such as in the Macintosh of Windows operating systems.

The processor 18 preferably executes programmed instruction steps, generates commands, stores data and analyzes data configurations according to programmed instruction steps that are stored in the memory unit 22 and in the data storage device 20. The processor 22 is preferably a microprocessor such as the Motorola 680(x)0, the Intel 80(x)86 or Pentium, Pentium II, and successors, or processors made by AMD, or Cyrix CPU of the any class.

The memory unit 22 is preferably a predetermined amount of dynamic random access memory, a read-only memory, or both. The memory unit 22 stores data, operating systems, and programmed instructions steps, and manages the operations of all hardware and software components in the system 10 and on the network 201, utilizing the communication device 26 whenever necessary or expeditious to link multiple computer systems 202 within the network 201.

The data storage device 20 is preferably a disk storage device for storing data and programmed instruction steps. In the exemplary embodiment, the data storage device 20 is a hard disk drive. Historical recordings of network usage are stored on distributed and centralized data storage devices 20.

The preferred embodiment of the input device 24 comprises a keyboard, microphone, and mouse type controller. Data and commands to the system 10 are input through the input device 24.

The present invention also includes a communication device 26. The communication device 26 underlies and sustains the operations of, referring now also to FIG. 2 the analysis 400 and execution 500 engines, the data reporting 600 and collection 700 means, the container editor 110, the search interface 300, and the search engine 320, providing the means to search, access, move, copy, utilize or otherwise perform operations with and on data. The communication device 26 utilizes one or more of the following technologies: modem, infrared, microwave, laser, photons, electrons, wave phenomena, cellular carrier, satellite, laser, router hub, direct cabling, physical transport, radio, broadcast or cable TV or other to communicate with other computers, digital-supported television, computer networks, or digital-based or supported public or published media, or physical media forms, on any a local, wide area, public, or any computer-based computer supported, or computer interfaced network, including but not limited to the Internet. It also allows for the functioning and distribution of any container 100 or container component herein described to reside anywhere on any computer system in any configuration on that local, wide area, public, or corporate computer-based or computer related network, or digital-based or supported media form.

Figure 2A:
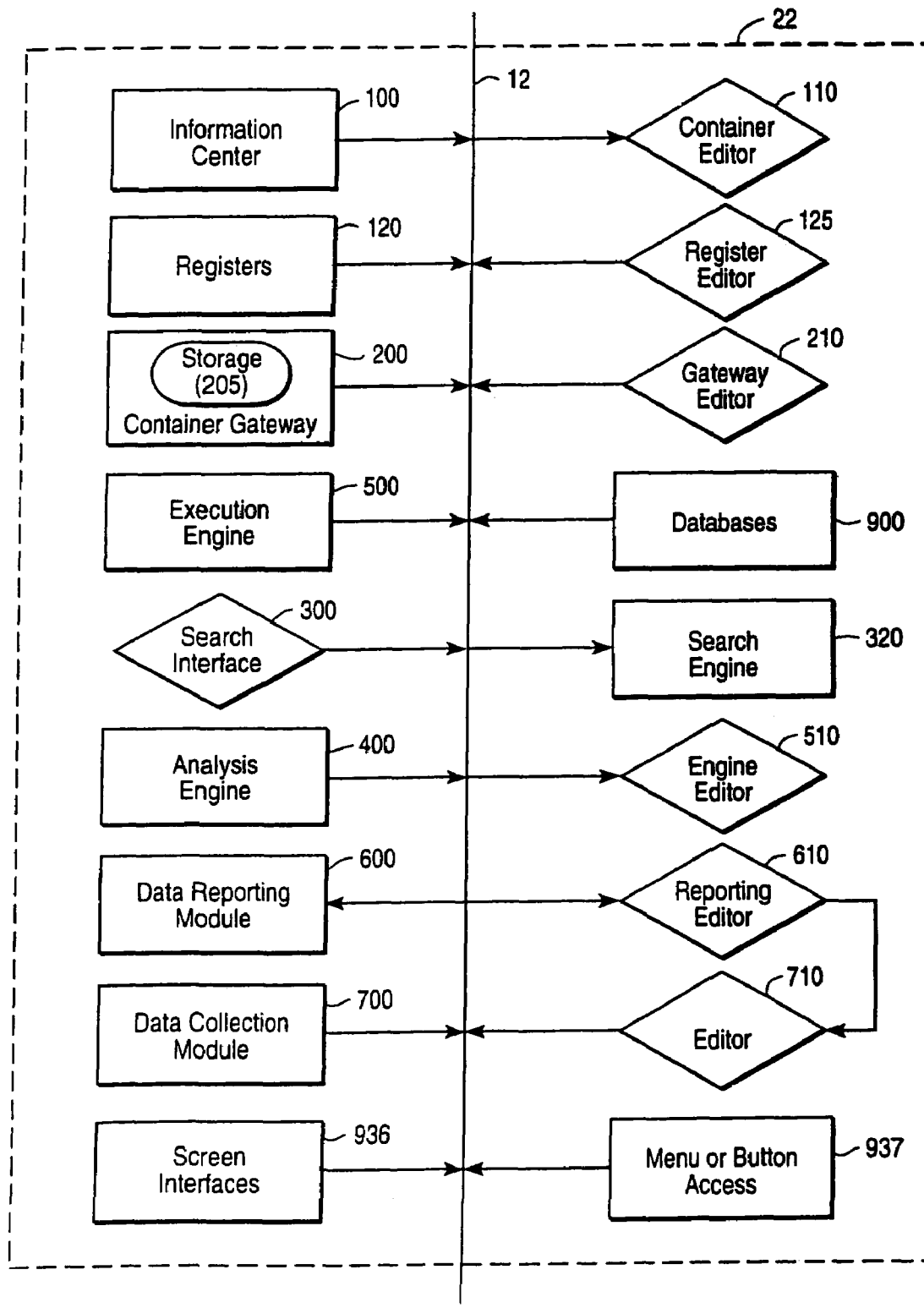
FIG. 2A is block diagram of a preferred embodiment of the memory unit.

Referring now to FIG. 2A, a preferred embodiment of the memory unit 22 is shown. The memory unit includes: an interactive information container 100, a container editor 110, container registers 120, a container register editor 125, system-wide hierarchical container gateways 200, gateway storage 205, gateway editors 210, engine editors 510, a search interface 300, search engine 320, analysis engine 400, execution engine 500, a data reporting module, 600, a data reporting editor 610, a data collection module 700, a data collection editor 710, screen interfaces (GUI's) 936, menu or access buttons from generic computer programs 937, and databases 900, all residing in memory optimized between a data storage means 20 such as magnetic, optical, laser, or other fixed storage, and a memory means 22 such as RAM. The memory unit 22 functions by operating on communications network 12 with a communication device 26 on multiple computer systems 202 within the network 201. These components will be described first briefly in the following paragraphs, then in more detail with reference to FIGS. 3 A through 17.

Those skilled in the art will realize that these components might also be stored in contiguous blocks of memory, and that software components or portions thereof may reside in the memory unit 22 or the data storage means 20.

The present invention includes information containers 100 as noted above. The information container 100 is a logically defined data enclosure which encapsulates any element or digital segment (text, graphic, photograph, audio, video, or other), or set of digital segments, or referring now to FIG. 3C, any system component or process, or other containers or sets of containers. A container 100 at minimum includes in its construction a logically encapsulated portion of cyberspace, a register and a gateway. A container 100 at minimum encapsulates a single digital bit, a single natural number or the logical description of another container, and at maximum all defined cyberspace, existing, growing and to be discovered, including but not limited to all containers, defined and to be defined in cyberspace. A container 100 contains the code to enable it to interact with the components enumerated in 2 A, and to reconstruct itself internally and manage itself on the network 201.

The container 100 also includes container registers 120. Container registers 120 are interactive dynamic values appended to the logical enclosure of an information container 100, and serve to govern the interaction of that container 100 with other containers 100, container gateways 200 and the system 10, and to record the historical interaction of that container 100 on the system 10. Container registers 120 may be values alone or contain code to establish certain parameters in interaction with other containers 100 or gateways 200.

The present invention also includes container gateways 200. Container gateways 200 are logically defined gateways residing both on containers 100 and independently in the system 10. Gateways 200 govern the interactions of containers 100 within their domain, and alter the registers 120 of transiting containers 100 upon ingress and egress.

The present invention also includes container gateway storage 205 to hold the data collected from registers 120 of transient containers 100 in order to make it available to the data collection means 700 and the data reporting means 600, and to store the rules governing the operations of its particular gateway 200, governing transiting containers upon ingress and egress, and governing the interactive behavior of containers 100 within the container 100 to which that gateway 200 is attached. Gateway storage 205 may be located on gateways 200 themselves, containers 100 or anywhere on the network 202, 201, including but not limited to Internet, Intranet, LAN, WAN, according to best analysis and use.

The memory unit 22 also includes an execution engine 500 to perform the functions on the system 10 as directed by the analysis engine after its analysis of data from the data reporting means 600, the data collection means 700, and the search interface 300.

The memory unit 22 also includes a search interface 300, by which the user enters, selects or edits search phrases or digital strings to be used by the search engine 320 to locate containers 100.

The memory unit 22 also includes an analysis engine 400 which performs rules based or other analysis upon the data collected from the search interface 300 and the data collection 700 and data reporting 600 means.

The memory unit 22 also includes a data reporting means 600, by which means the information collected by gateways 200 from transient containers 100 is sent to the analysis engine 400.

The memory unit 22 also includes a data collection means 700, by which means the analysis engine 400 gathers the information collected by gateways 200 from transient containers 100.

The memory unit 22 also includes a container editor 110 for creating, selecting, acquiring, modifying and appending registers 120 and gateways 200 to containers 100, for creating, selecting, acquiring, and modifying containers, and for selecting content 01 to encapsulate.

The memory unit 22 also includes a register editor 125, for creating, selecting, acquiring and modifying container registers 120 and establishing and adjusting the values therein.

The memory unit 22 also includes a gateway editor 210, by which means the user determines the rules governing the interaction of a given gateway 210 with the registers 120 of transient containers 100, governing transiting containers upon ingress and egress, and governing the interactive behavior of containers within the container to which that gateway is attached.

The memory unit 22 also includes databases 900, by which means the analysis engine 400, the execution engine 500, the gateways 100, the editors 110, 125, 210, 510, 610, 710, and the search interface 300, store information for later use.

Figure 4:
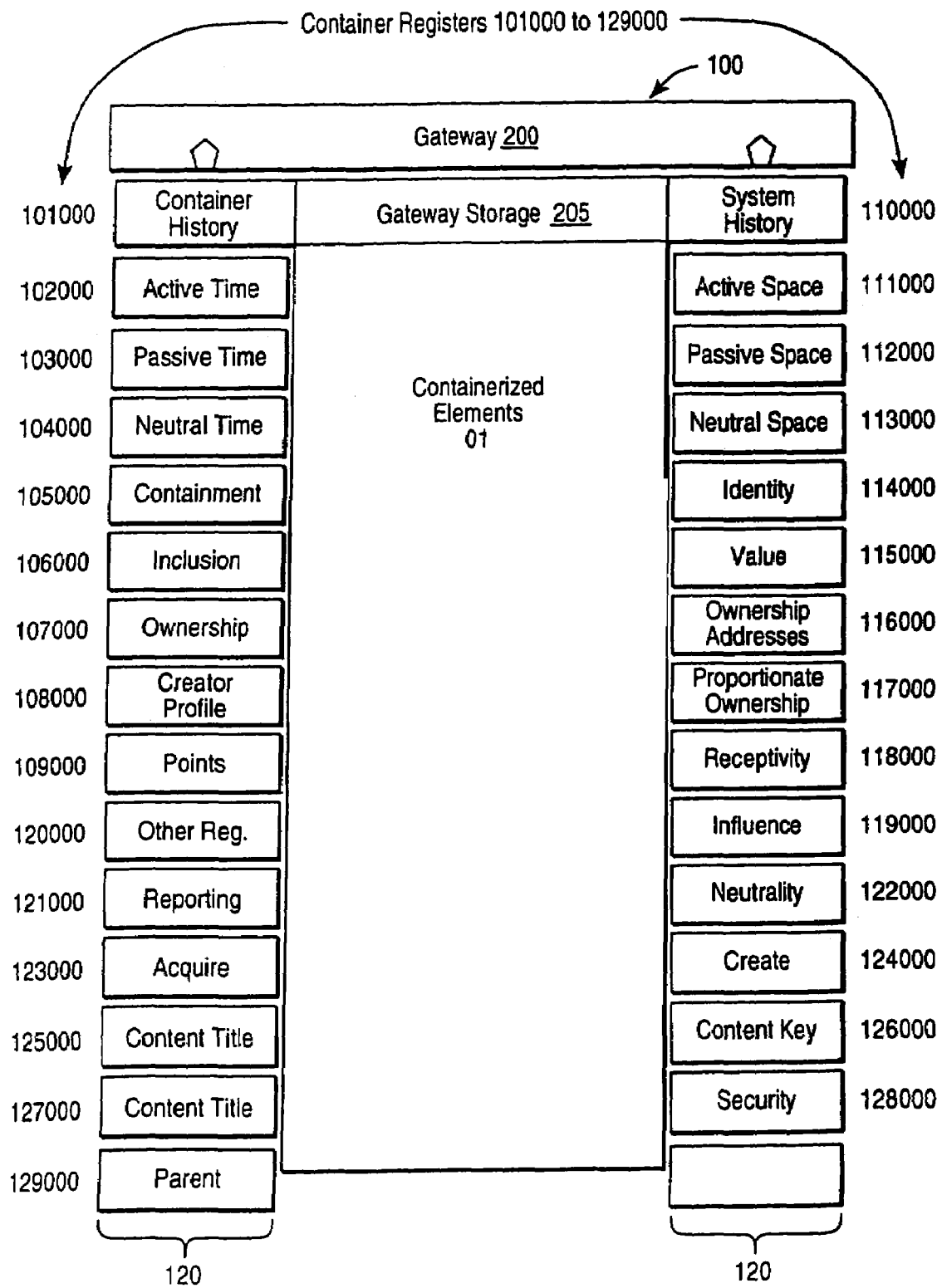
FIG. 4 is a drawing of an information container showing a gateway and registers logically encapsulating containerized elements.

The memory unit 22 present invention also includes a search engine 320 by which means the user is able to locate containers 100 and, referring now to FIG. 4, containerized elements 01.

The memory unit 22 present invention also includes an engine editor 510, by which means the user establishes the rules and operating procedures for the analysis engine 400 and the execution engine 500.

The memory unit 22 present invention also includes a reporting means editor 610, by which means the user establishes the rules and schedule under which the information collected by gateways 200 from transient containers 100 will be sent to the analysis engine 400.

The memory unit 22 present invention also includes a collection means editor 710, by which means the user establishes the rules and schedule under which the analysis engine 400 will gathers the information collected by gateways 200 from transient containers 100.

The memory unit 22 present invention also includes screen interfaces (GUI's) 936, specifically designed to simplify and enhance the operations of the container editor 110, the gateway editor 210, and the search interface 300.

The present invention also includes a menu or button access 937, by which a user utilizing any generic computer program may access the system 10 or the container editor 110 from a menu selection(s) or button(s) within that program.

The present invention also includes a computer, media or publishing network 201, comprising computers, digital devices and digital media 202 and a communication device 26, within which the components enumerated in FIG. 2A interact, compiling, analyzing, and altering containers 100 and the network 201 according to information gathered from container registers 120.

The memory unit 22 also includes one or more computers 202, by which means the components of FIG. 1 sustain the operations described in FIG. 2A.

The memory unit 22 also includes flat or relational databases 900, used where, and as required. Databases are used to store search phrases, search templates, system history for the analysis engine and execution engine, container levels and container, sites and digital elements, or any and all storage required to operate the system.

Figure 2B:
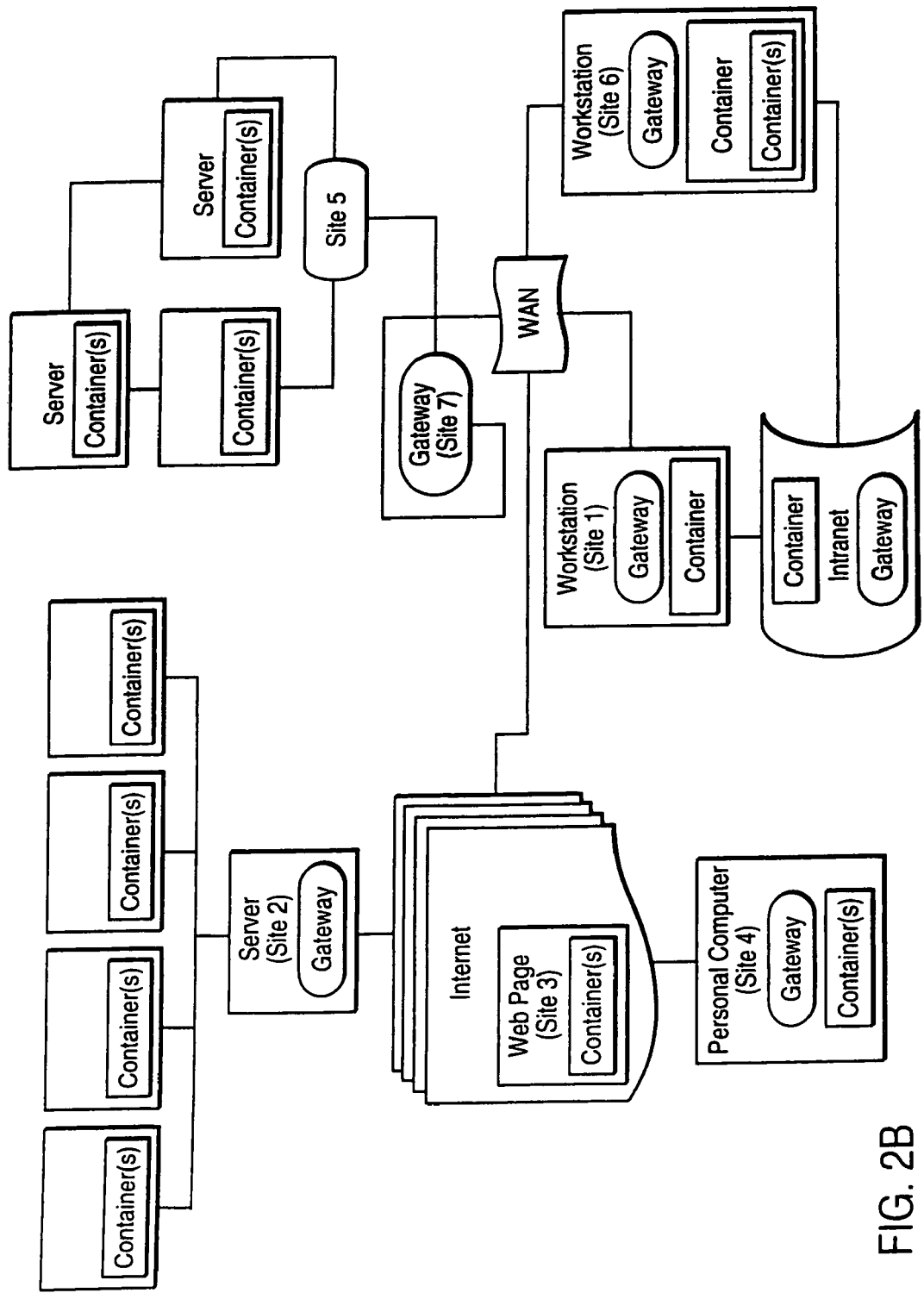
FIG. 2B is an exemplary embodiment of a computer network showing computer servers, personal computers, workstations, Internet, Wide Area Networks, Intranets in relationship with containers and gateways.
Figure 2C:
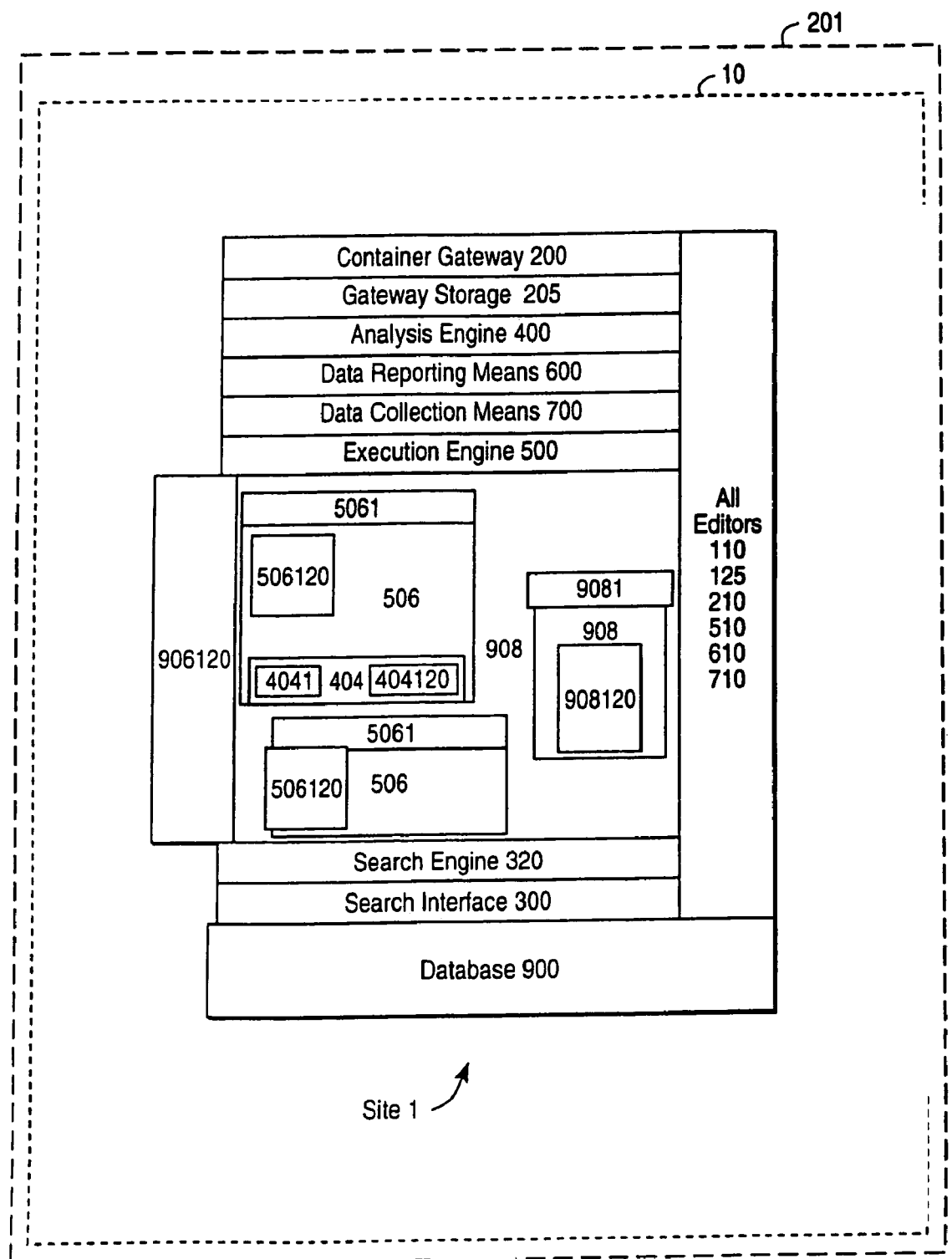
FIGS. 2C through 2H are exemplary embodiments in block diagram form of computer network components showing a possible placement of nested containers, computer servers, gateways, and the software components named in FIG. 2A on a network.
Figure 2D:
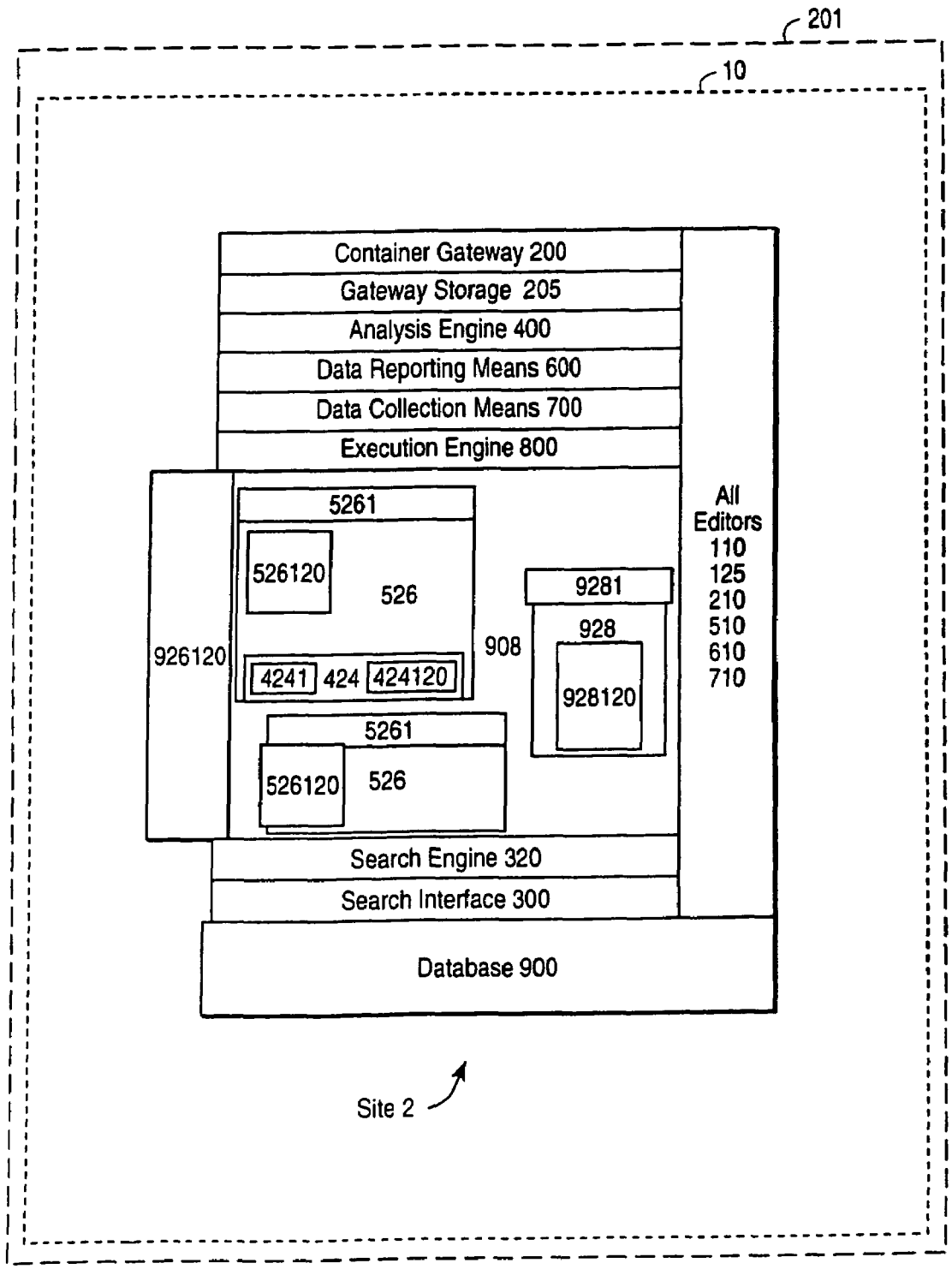
Figure 2E:
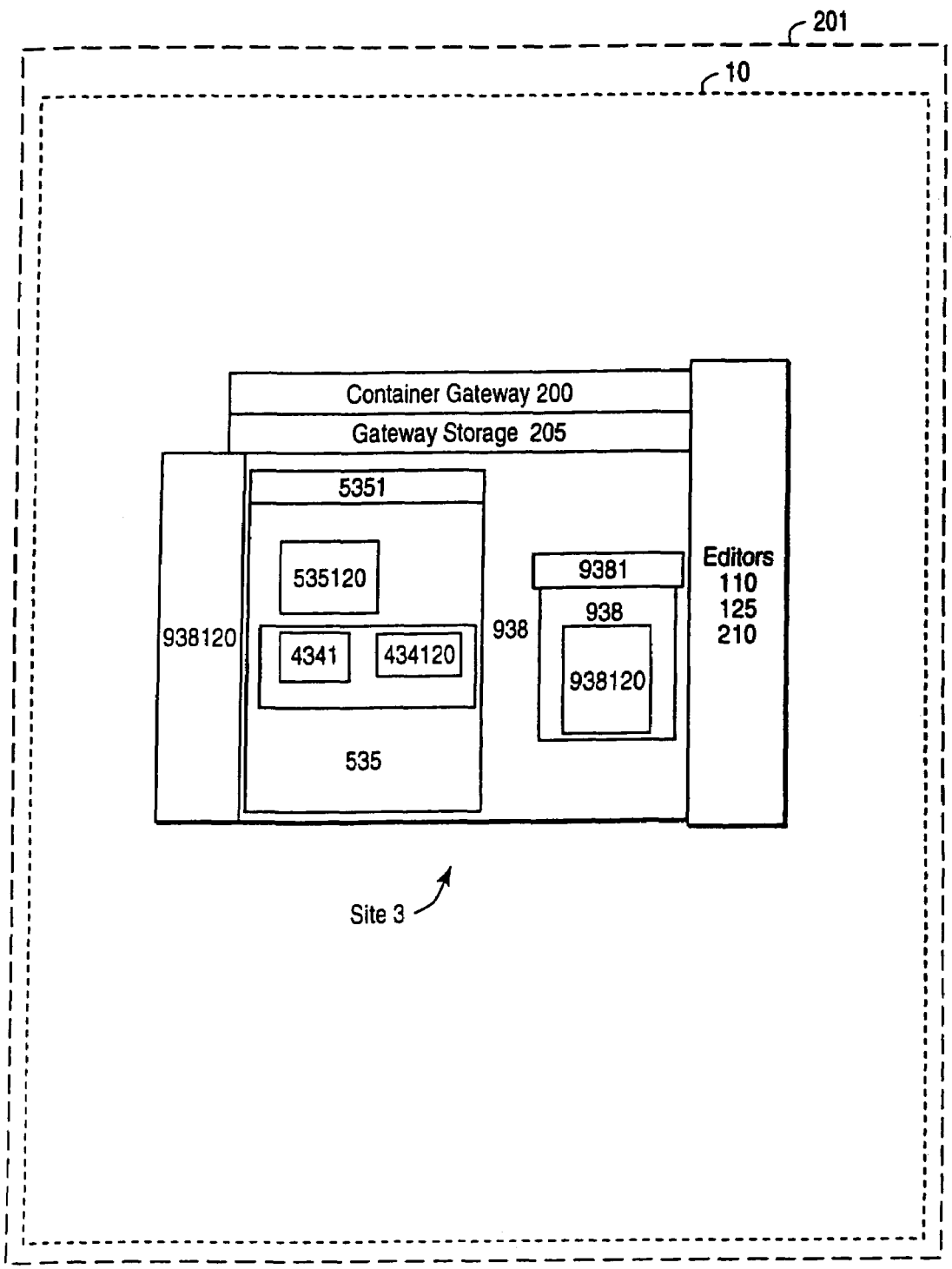
Figure 2F:
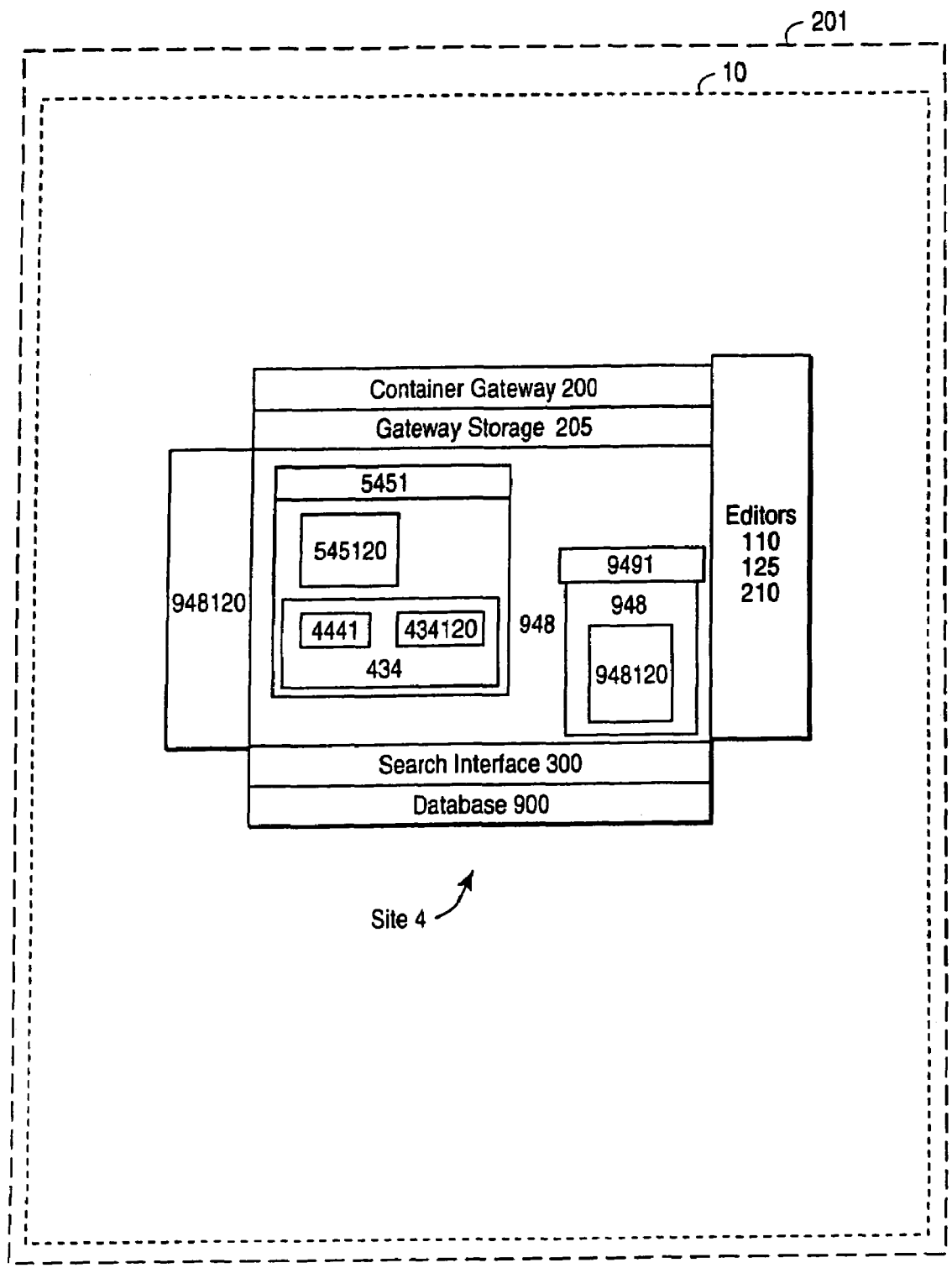
Figure 2G:
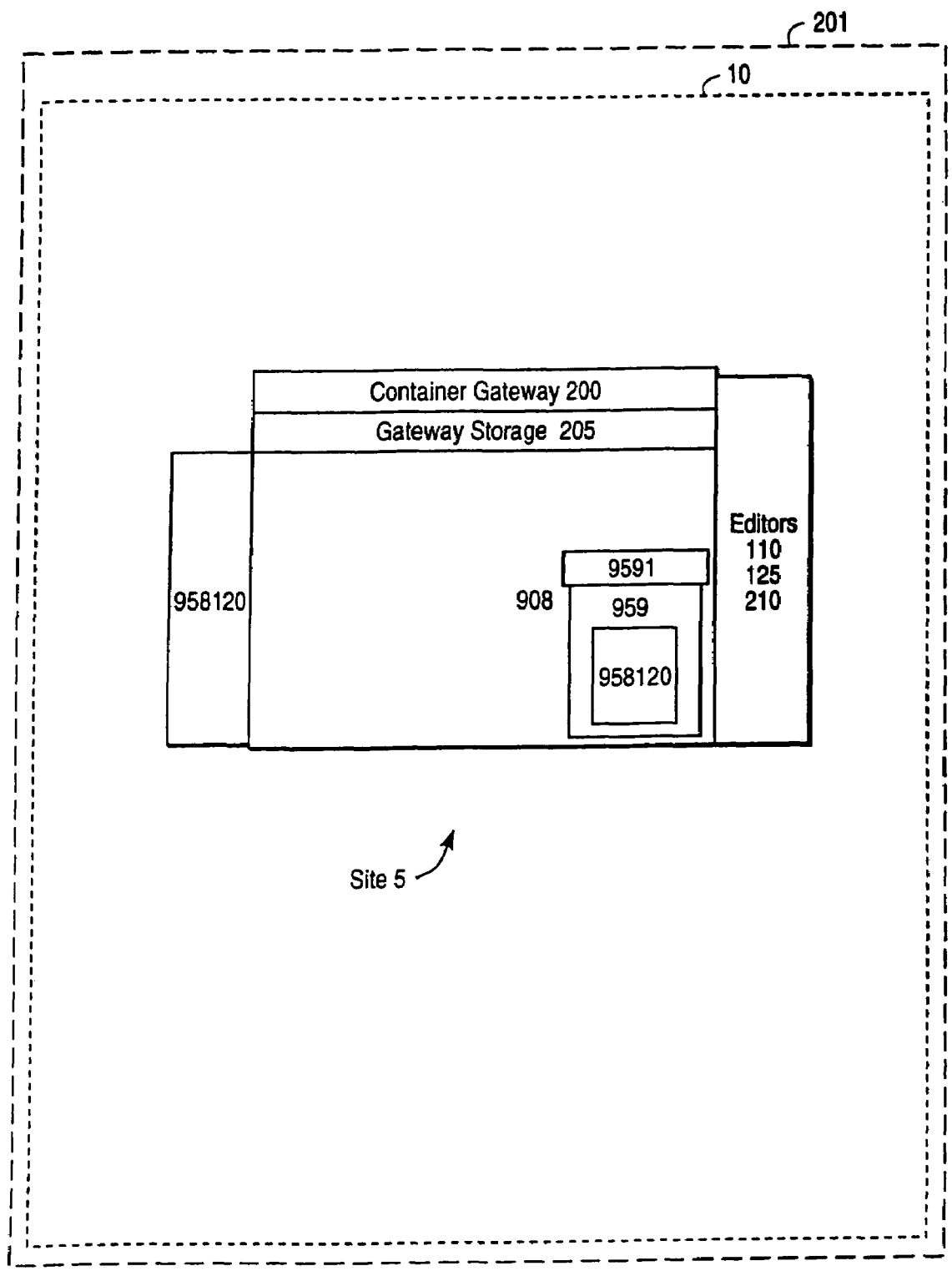
Figure 2H:
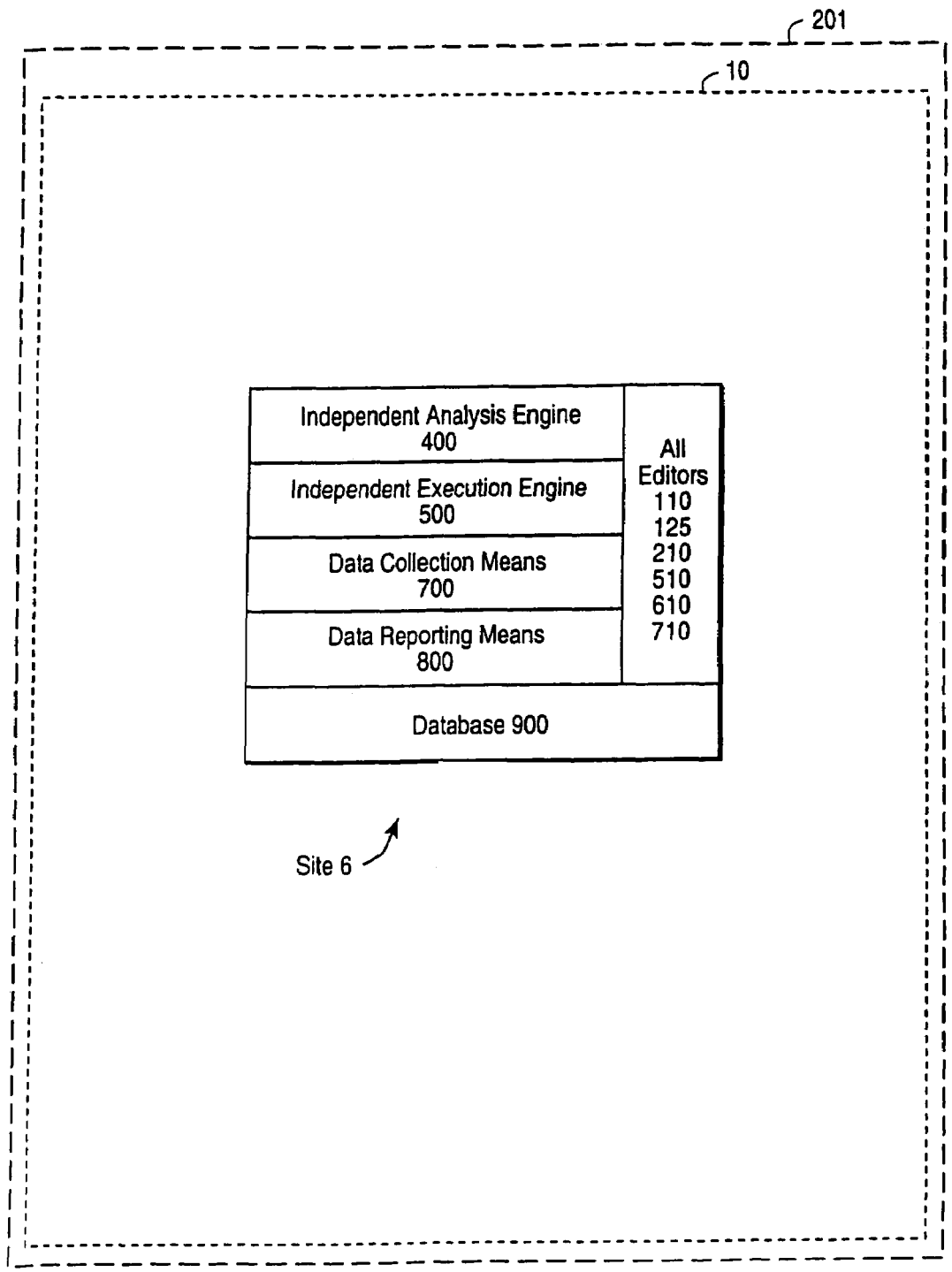

Referring now to FIG. 2B, a drawing of a computer network 201 as a system 10, showing a possible placement of nested containers 100, computer servers, gateways 200, on the sites described below. (Note: FIG. 2B utilizes in parts the same numbering scheme as FIGS. 13 A, 13 B, 13 C, 13 D and as FIG. 2A.) In FIG. 2B various exemplary sites are shown, any or all of which might interact dynamically within the system. Site 1 shows a single workstation with a container and gateway connected to an Intranet. (Individual containers may be a floppy or CD-Rom to be downloaded or inserted.) Site 2 shows a server with a gateway in relationship to various containers. Site 3 shows an Internet web page with a container residing on it. Site 4 shows a personal computer with containers and a gateway connected to the Internet. Site 5 shows a configuration of multiple servers and containers on a Wide Area Network. Site 6 shows a workstations with a gateway and containers within a container connected to a Wide Area Network. Site 7 shows an independent gateway, capable of acting as a data collection and data reporting site as it gathers data from the registers of transiting containers, and as an agent of the execution engine as it alters the registers of transient containers. A container 100 contains the code to enable it to interact with the components enumerated in 2A, and to reconstruct itself internally and manage itself on the network 201. The code resides in and with the container in its registers and gateway definitions and controls. Additional system code resides in all sites to manage the individual and collective operation and oversight of the components enumerated in 2A, with the specific components distributed amongst the sites according to the requirements of optimization.

Referring now to FIG. 2B1 various exemplary sites are shown as described above in FIG. 2B, with the addition of possible location of one or more gateway storage 205 locations.

Referring now to FIGS. 2C through 2H, various exemplary sites with one or more of the logical components of the system 10 in relationship are shown. Site 1 comprises an interactive information container 100, a container editor 110, container registers 120, a container register editor 125, system-wide hierarchical container gateways 200, gateway storage 205, gateway editors 210, engine editors 510, a search interface 300, search engine 320, analysis engine 400, execution engine 500, a data reporting means 600, a data reporting means editor 610, a data collection means 700, a data collection means editor 710, and databases 900, all residing on data storage means 20, utilizing the memory unit to function 22, operating on communications network 12 with a communication device 26.

Site 2 comprises an interactive information container 100, a container editor 110, container registers 120, a container register editor 125, system-wide hierarchical container gateways 200, gateway storage 205, gateway editors 210, engine editors 510, search engine 320, analysis engine 400, execution engine 500, a data reporting means 600, a data reporting means editor 610, a data collection means 700, a data collection means editor 710, and databases 900, all residing on data storage means 20, utilizing the memory unit to function 22, operating on communications network 12 with a communication device 26.

Site 3 comprises an interactive information container 100, a container editor 110, container registers 120, a container register editor 125, hierarchical container gateways 200, gateway storage 205, gateway editors 210, and databases 900, all residing on data storage means 20, utilizing the memory unit to function 22, operating on communications network 12 with a communication device 26.

Site 4 comprises an interactive information container 100, a container editor 110, container registers 120, a container register editor 125, hierarchical container gateways 200, gateway storage 205, gateway editors 210, a search interface 300, and databases 900, all residing on data storage means 20, utilizing the memory unit to function 22, operating on communications network 12 with a communication device 26.

Site 5 comprises an interactive information container 100, container registers 120, a container register editor 125, hierarchical container gateways 200, gateway storage 205, and databases 900, all residing on data storage means 20, accessed and utilized by non-resident memory unit 22, operating on communications network 12 with a communication device 26.

Site 6 includes an independent analysis engine 400, execution engine 500, data collection means 700, and data reporting means 600 gateway editors 210, engine editors 510, a data reporting means editor 610, a data collection means 700, a data collection means editor 710, and databases 900, all residing on data storage means 20, utilizing the memory unit to function 22, operating on communications network 12 with a communication device 26.

Figure 3A:
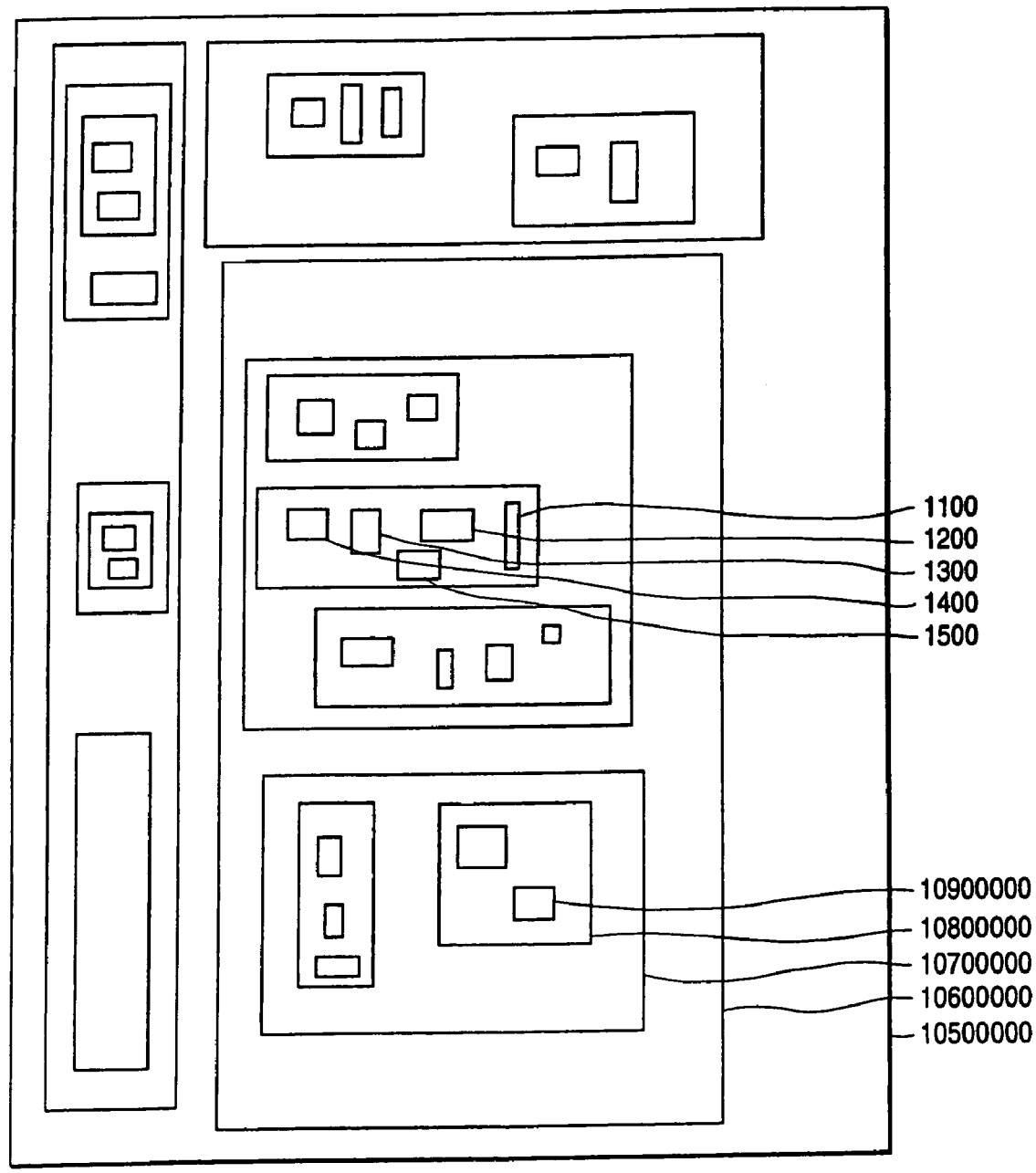
FIG. 3A is a graphical representation for one embodiment of a container having a plurality of containers nested within that container.
Figure 3B:
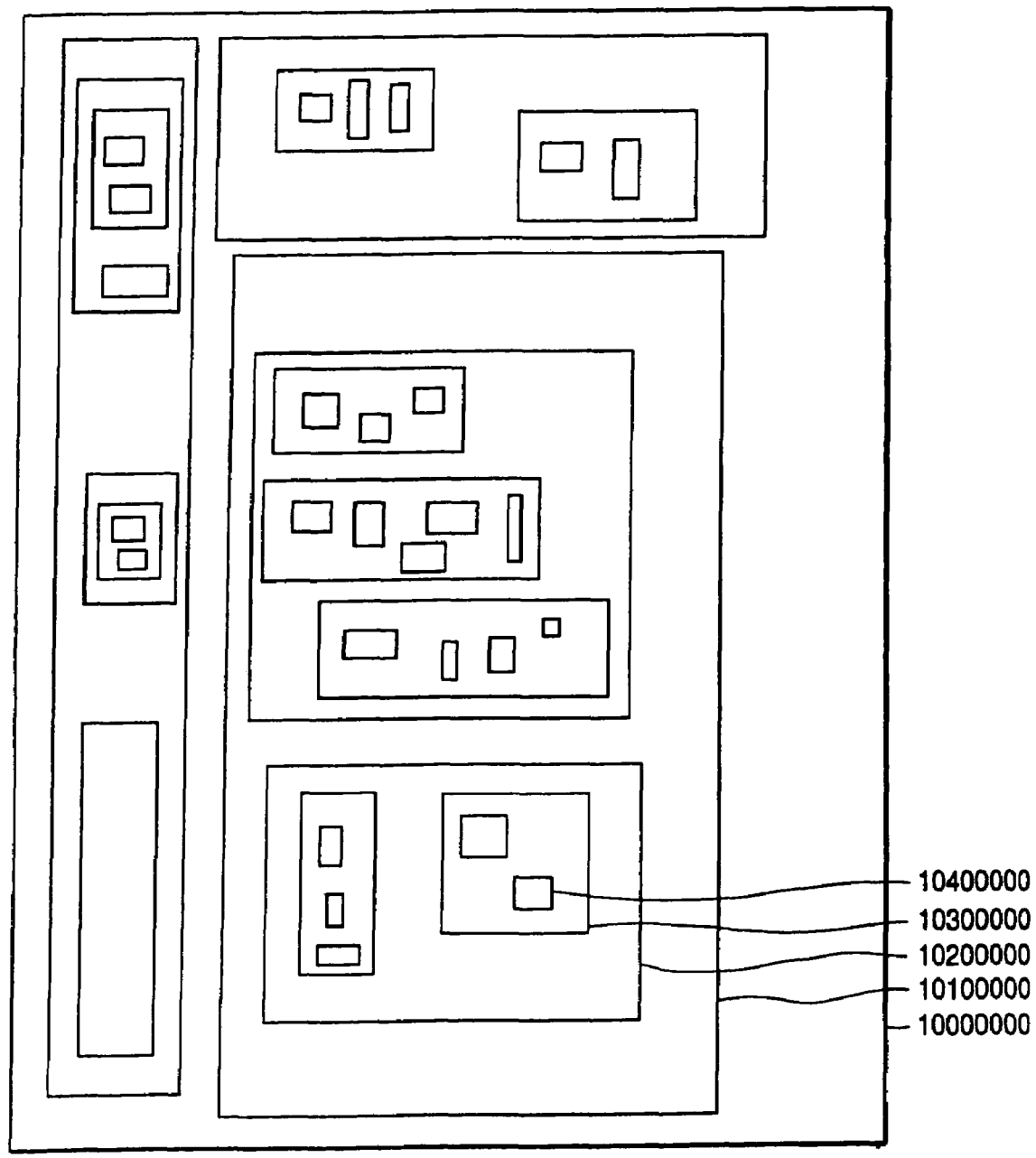
FIG. 3B is a graphical representation for a second embodiment of a container having a plurality of containers nested within that container.

Referring now to FIG. 3A and FIG. 3B, a block diagram of several nested information containers is shown, including examples of elements, e.g., code 1100, text 1200, audio 1300, video 1400, photograph 1500, graphic images 1600, and examples of possible container level classifications in increasing size, e.g., element 10900000, document 10800000, database 10700000, warehouse 10600000, domain 10500000, and continuing increasingly larger on FIG. 3 (B), subject 10400000, field 10300000, master field 10200000, species 10100000. Containers may be infinitely nested and assigned any class, super class or sub class scheme and description by the creator of the container to govern nesting within that container. In addition to digital elements, containers may also include system process and components, including containerization itself.

Figure 3C:
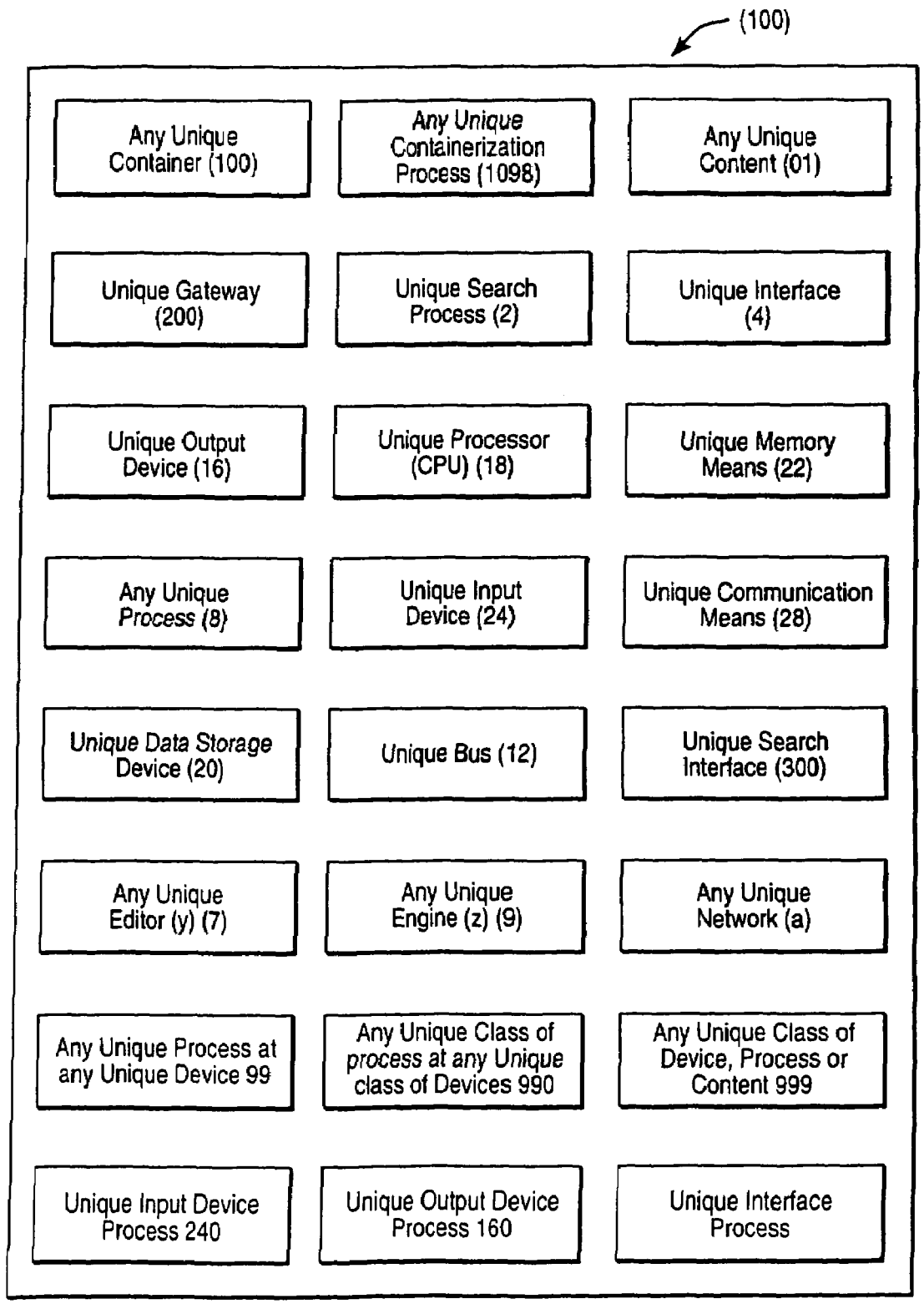
FIG. 3C is a drawing showing elements that might be logically encapsulated by a container.

Referring now to FIG. 3C, a block diagram of an information container system is shown, listing, without any relationship indicated, some of the possible system components and processes, or sets thereof, that may be encapsulated as elements 01 in an information container 100. An information container 100 may include one or more of the following: any unique, container 100, gateway 200, output device 16, input device 24, output device process 160, input device process 240, data storage device 20, data storage device process 2000, processor 18, bus 12, content 01, search process 02, interface 04, memory unit 22, communication device 26, search interface 300, search process 98, network 201, class of device, process or content 999, class of process at any unique class of device 990, process at any unique device 99, editor 110, 125, 210, 510, 610, 710, engine 320, 400, 500, containerization process 1098, or process 08.

Any container may include (n) other containers, to infinity. The use of value evolving container registers 120 in conjunction with gateways 200, data reporting modules 600, data collection modules 700, the analysis engine 400, and the execution engine 500 provides the information container 100 with extensive knowledge of the use, operation of its internal contents, prior to, during and after those contents' residence within that container 100, and extensive knowledge of the use, operation and contents of the system 10 external to itself, and allows the container 100 to establish and evolve its own identity and course of interaction on the system 10. Further, containers 100, as logical enclosures, can exist and operate independent of their digital contents, whether encapsulating audio, video, text, graphic, or other.

Referring now to FIG. 4, a block diagram of an information container 100 is shown. The information container 100 is a logically defined data enclosure which encapsulates any element, digital segment (text, graphic, photograph, audio, video, or other), set of digital segments as described above with reference to FIG. 3 (C), any system component or process, or other containers or sets of containers. The container 100 comprises the containerized elements 01, registers 120 and a gateway 200.

Registers 120 appended to an information container 110 are unique in that they operate independently of the encapsulated contents, providing rules of interaction, history of interaction, identity and interactive life to that container 100 through the duration of its existence on a network 201, without requiring reference to, or interaction with, its specific contents. They enable a container 100 to establish an identity independent of its contents. Additionally, registers 120 are unique in that their internal values evolve through interaction with other containers 100, gateways 200, the analysis engine 400, the execution engine 500, and the choices made by the users in the search interface 300, the container editor 110, the register editor 125, the gateway editor 210, the engine editor 510. Registers 120 are also unique in that they can interact with any register of a similar definition on any container 100 residing on the network 201, independent of that container's contents. Registers 120, once constructed, may be copied and appended to other containers 100 with their internal values reset, to form new containers. Register values, when collected at gateways 200 and made available to the analysis engine 400 through the data collection means 700 and the data reporting means 600, provide an entirely new layer of network observation and analysis and operational control through the execution engine 500. Registers 120 accomplish not only a real time information about information system, but also a real time information about information usage on a network. Further, because the user base of a network determines usage, the system 10, in gathering information about information usage, is observing the choices of the human mind. When these choices are submitted to the analysis of a rules-based or other analysis engine 400, the system 10 becomes capable of becoming progressively more responsive to the need of the user base, in effect, learning to become more useful by utilizing the execution engine 500 to create system-wide changes by altering the rules of gateway 200 interaction and thereby altering the registers 120 of transient containers 100 and establishing a complete evolutionary cycle of enhanced utility.

Further, in establishing the pre-defined registers as described in the following four paragraphs, the following unique aspects of information about information are utilized for the first time: 1) the dynamic governance of information according to its utility through time, in active, passive and neutral aspects, as explained below; 2) the dynamic governance of information according to its utility through space in active, passive and neutral aspects, as explained below; 3) the dynamic governance of information according to its ownership, as explained below; 4) the dynamic governance of information according to its unique history of interaction as an identity on a network, as explained below; 5) the dynamic governance of information according to the history of the system on which it exists, as explained below; 6) the dynamic governance of information according to established rules of interaction, in active, passive and neutral aspects, as explained below; 7) the dynamic governance of information according to the profile of its creator, as explained below; 8) the dynamic governance of information according to the value established by its ongoing usage, as explained below; 9) the dynamic governance of information according to it distributed ownership, as explained below; 10) the dynamic governance of information according to what class of information it might be incorporated into, and according to what class of information container it might incorporate, as explained below; 11) the dynamic governance of information according to self-reporting, as explained below.

Referring now to FIG. 4, registers 120 may be (1) pre-defined, (2) created by the user or acquired by the user, or (3) system-defined or system-created. Pre-defined registers 120 are those immediately available for selection by the user within a given container editor as part of that container editor, in order that the user may append any of those registers 120 to a container 100 and define values for those registers 120 where required. Registers 120 created by the user are those conceived and created by a specific user or user group and made immediately available for selection by the user or user group in conjunction with any of a wide number of container editors, in order that the user may append any of those registers 120 to a container 100 and define values for those registers 120 where required. Registers 120 acquired by the user are those registers existing network-wide 201, created by the user base, that might be located and acquired by the user in order that the user may append any of those registers 120 to a container 100 and define values for those registers 120 where required. System-defined registers are those registers whose values are set and/or controlled by the system 10. System-created registers are those registers created by the system 10.

Registers 120 are user or user-base created or system-created values or ranges made available by the system 10 to attach to a unique container, and hold system-set, user-set, or system-evolved values. Values may be numeric, may describe domains of time or space, or may provide information about the container 100, the user, or the system 10. Registers 120 may be active, passive or interactive and may evolve with system use. Pre-defined registers include, but are not limited to, system history 110000, container history 101000, active time 102000, passive time 103000, neutral time 104000, active space 111000, passive space 112000, neutral space 113000, containment 105000, inclusion 106000, identity 114000, value 115000, ownership 107000, ownership addresses 116000, proportionate ownership 117000, creator profile 108000, receptivity 118000, influence 119000, points 109000, others 120000, reporting 121000, neutrality 122000, acquire 123000, create 124000, content title 125000, content key phrase(s) 126000, and content description 127000, security 12800, and parent rules 129000.

Pre-defined registers comprise an historical container register 101000, logging the history of the interaction of that container 100 with other containers, events and processes on the network 201, an historical system register 110000, logging the history of pertinent critical and processes on the network, a point register 109000 accumulating points based upon a hierarchically rated history of usage, an identity register 114000 maintaining a unique network wide identification and access location for a given container specifying a unique time and place of origin and original residence, a proportionate ownership register 117000 maintaining a record of ownership percentage and economic values, and others 120000.

User-defined registers include a report register 121000 setting trigger levels for report sequences, content determination and delivery target, three time registers, consisting of a range, map, graph, list, curve or other designating time relevance, 102000 assigning the time characteristics by which that container will act upon another container or process, 103000 assigning the time characteristics by which that container be acted upon by another container or process, and 104000 assigning the time characteristics by which that container will interact with another container or process, three space registers, consisting of a range, map, graph, list, curve or other designating the domain and determinants of space relevance,

111000 assigning the space characteristics by which that content will act upon another container or process, 112000 assigning the space, characteristics by which that content will be acted upon by another container or process, and 113000 assigning the space characteristics by which that container will interact with another container or process, a domain of influence register 119000, determining the set, class and range of containers upon which that container will act, a domain of receptivity register 118000, determining the set, class and range of containers allowed to act upon that container, a domain of neutrality register 122000, determining the set, class and range of containers with which that container will interact, a domain of containment register 105000, determining the set, class and range of containers which that container may logically encompass, a domain of inclusion 106000 register, determining the set, class and range of containers by which that container might be encapsulated, an ownership register 107000, recording the original ownership of that containers, a creator profile register 108000, describing the creator or creators of that container, an ownership address register 116000, maintaining the address of the creator or creators of that container, a value register 115000, assigning a monetary or credit value to that container, other registers 120000 created by users or the system, a reporting register 121000, determining the content, scheduling and recipients of information about that container, a neutrality register 122000, an acquire register 123000, enabling the user to search and utilize other registers residing on the network, a create register 124000, enabling the user to construct a new register, a content title register 125000, naming the contents of the container, a content key register, 126000, identifying the container contents with a key phrase generated by the user and/or the system based upon successful usage of that phrase in conjunction with the utilization of the information within that container 100, a content description register 127000, identifying the container contents with additional description, a security register 128000, controlling container security, and a parent container register 129000, storing the rules governing container interaction as dictated by the parent (encapsulating) container.

The container also includes a gateway 200 and gateway storage 205.

Gateways 200 are logically defined passageways residing both on containers 100 and independently in the system 10. Gateways 200 govern the interactions of containers 100 encapsulated within their domain by reading and storing register 120 information of containers entering and exiting that container 100.

The present invention also includes container gateway storage 205. Gateway storage 205 stores information regarding the residence, absence, transience, and alteration of encapsulated and encapsulating containers 100, and their attached registers 120, holding the data collected from registers 120 of transient containers 100 in order to make it available to the data collection means 700 and the data reporting means 600, and storing the rules governing the operations of its particular gateway 200.

Figure 5:
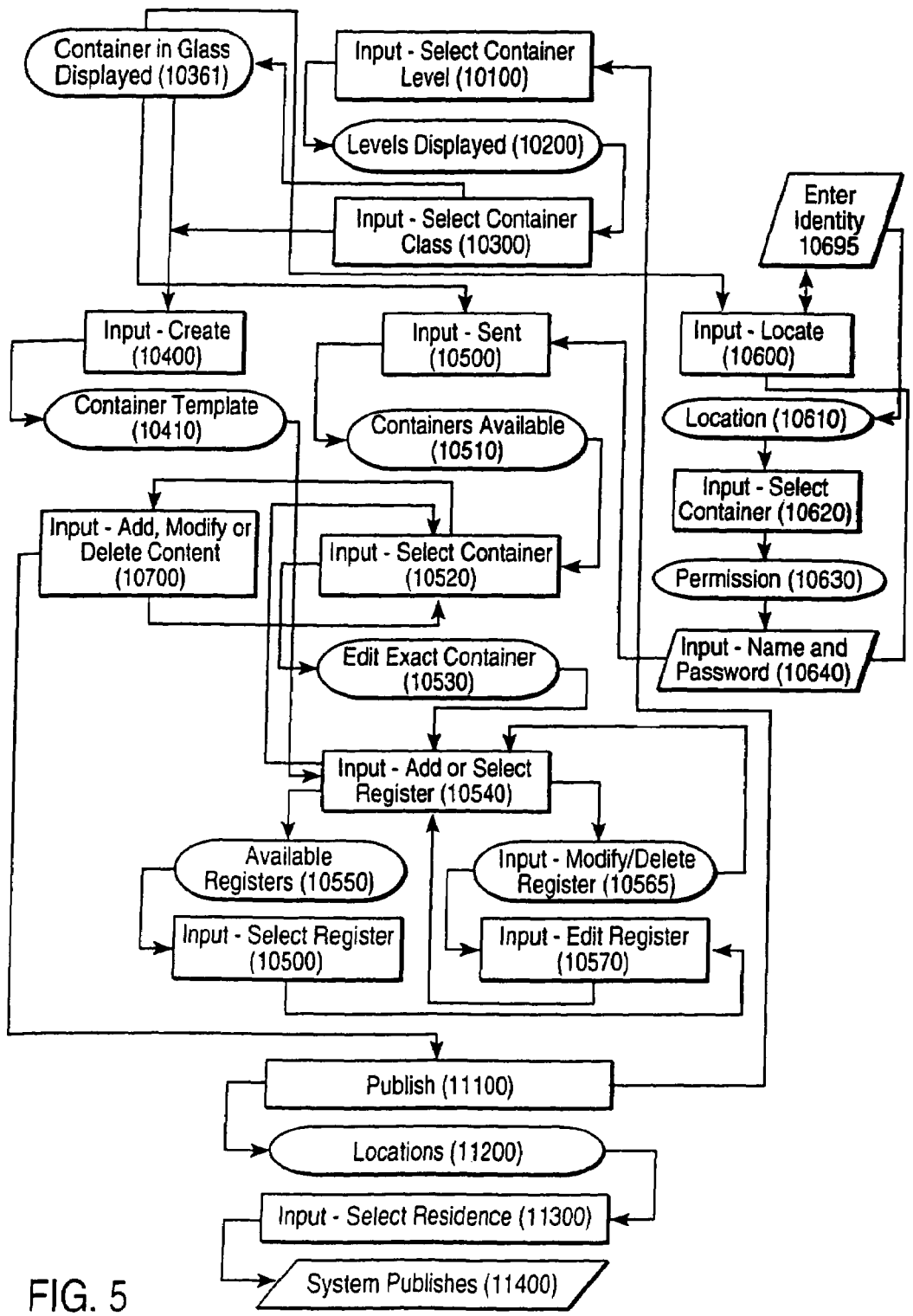
FIG. 5 is a flowchart showing a preferred method for the containerization process and container editor operating on the communication device.

Referring now to FIG. 5, a flow chart of the preferred method for creating a container 100 is shown.

Input is received from the user selecting a container level through use of a drop-down menu 10100. A menu of all possible container classes within the subset and superset scheme of multiple hierarchically nested containers, i.e.; element, document, file, database, warehouse, domain, and more, is displayed on the output device 10200. Input is received from the user selecting a class 10300.

A graphic representation of a container in that class, with registers common to all containers as well as registers unique to its class is displayed 10301.

Input is received from the user choosing to "create" 10400, "edit" 10500, or "locate" 10600.

When the input of "create" 10400 is received from the user, a container template in that class appears 10410. Input from the user is then received adding or selecting a register 10540 to append to that container template. When input is received from the user adding a register, a list of registers that might be added to that class of container is made available to select 10550. Input is received from the user selecting a register 10560 and editing it 10570. The menu returns to "add or select" 10540.

If the input of "locate" 10600 is received from the user, the system prompts the user to enter the identity of the container or class of containers 10605. The system locates the container(s) 10610. Input is received from the user selecting a container 10620. The system prompts the user for a security code for permission to access the container for template use, or to alter its registers, or to alter its content 10630. Input is received from the user entering a name and password providing access to one of the security levels 10640. Input is received from the user editing the container accordingly by transition to step 10500 and performing the steps for editing.

If the input of "edit" 10500 is received, a list of containers available to edit at that level is shown 10510. Input is received from the user selecting a container 10520. That container appears, available to edit 10530. Input is received from the user selecting "add" or "select" registers 10540 by the user clicking on the graphically depicted register, or from a drop down menu. Input is received from the user selecting the register to edit 10560. Input is received from the user selecting "modify" or "delete" for that register 10565. If input is received from the user to "delete," that register is severed from the container. If input is received from the user to "modify", the register editor 10570 screen appropriate to that register appears, i.e., an x-y type graph to define a curve of relevant active time, in which the user manipulates the x-y termini, scale and curve, or a global map in which Input is received from the user selecting the locale of active space, whether zip code, city, county, state, country, continent, plant or other. When input is received from the user saving the definition, the screen returns to the main container screen to make another selection available. Input is received from the user defining as many registers as he chooses. One of the registers may be named "new register." Input is received from the user selecting the new register, and if chosen by the user, defining a wholly unique and new kind of register by the user entering input into the register editor 125.

When the input is received from the user choosing to add a register, a list of registers that might be added to that class of container are made available to select 10550. Input is received from the user selecting a register 10560 and editing it 10570. The menu returns to "add or select" 10540, and in turn to Input-Select Container.

Input may then be received from the user choosing to add, modify, or delete the container contents 10700. Once the registers are defined, input is received from the user indicating completion and the interface reverts to the container editor. When input is received from the user choosing "select component" (to select the component to containerize) from the main menu bar 10700, a window appears allowing the user to select any file, component, or other container. If for example, the user were creating a warehouse container, and wishes to incorporate several databases into that container, input would then be received from the user selecting "database." The program would prompt the user for the location (directory) of that database or container. If the requested selection is not containerized, input may then be received from the user choosing to containerize the element at that time, after which the program returns to "select component." Once input is received from the user defining the database location, the program logically encases the directory or directories in the defined container. The above procedure may be repeated as many times as desired to include multiple databases within a single container. While logical simplicity would dictate that all containers within a container be of the same subset, it would be possible for input to be received from the user choosing containers of any subset to include in the container. When input is received from the user choosing "finished," the container is created with a unique network identity, preferably through some combination of exact time and digital device serial number, or centralized numbering system, or other means. The container 100 contains all digital code, including data and program software from the selected items or containers.

Input may then be received from the user to publish the container 11100 at a user-identified or system suggested location 11200 to be selected 11400.

Input is received from the user to "publish", from the main menu bar 11100. Input is received from the user choosing to leave the container where it was created, move or copy it to another drive, directory, computer, or network the user designates, or select the location from location options offered by the system 11200, or submit, or duplicate and submit, the container to the analysis engine 400 for intelligent inclusion in other containers, thus allowing the system to publish the container as instructed or choose the residence of the container 11400.

If input is received from the user to choosing to "move," or "copy" a browse function allows the user to name the new location or browse a list of possible locations. If input is received from the user choosing to "submit," a browser function allows the user to name the analysis search engine 310 or browse a list of possible analyses engines. When input is received from the user choosing the residence of the container 11300, the program restores the search interface screen.

Figure 6:
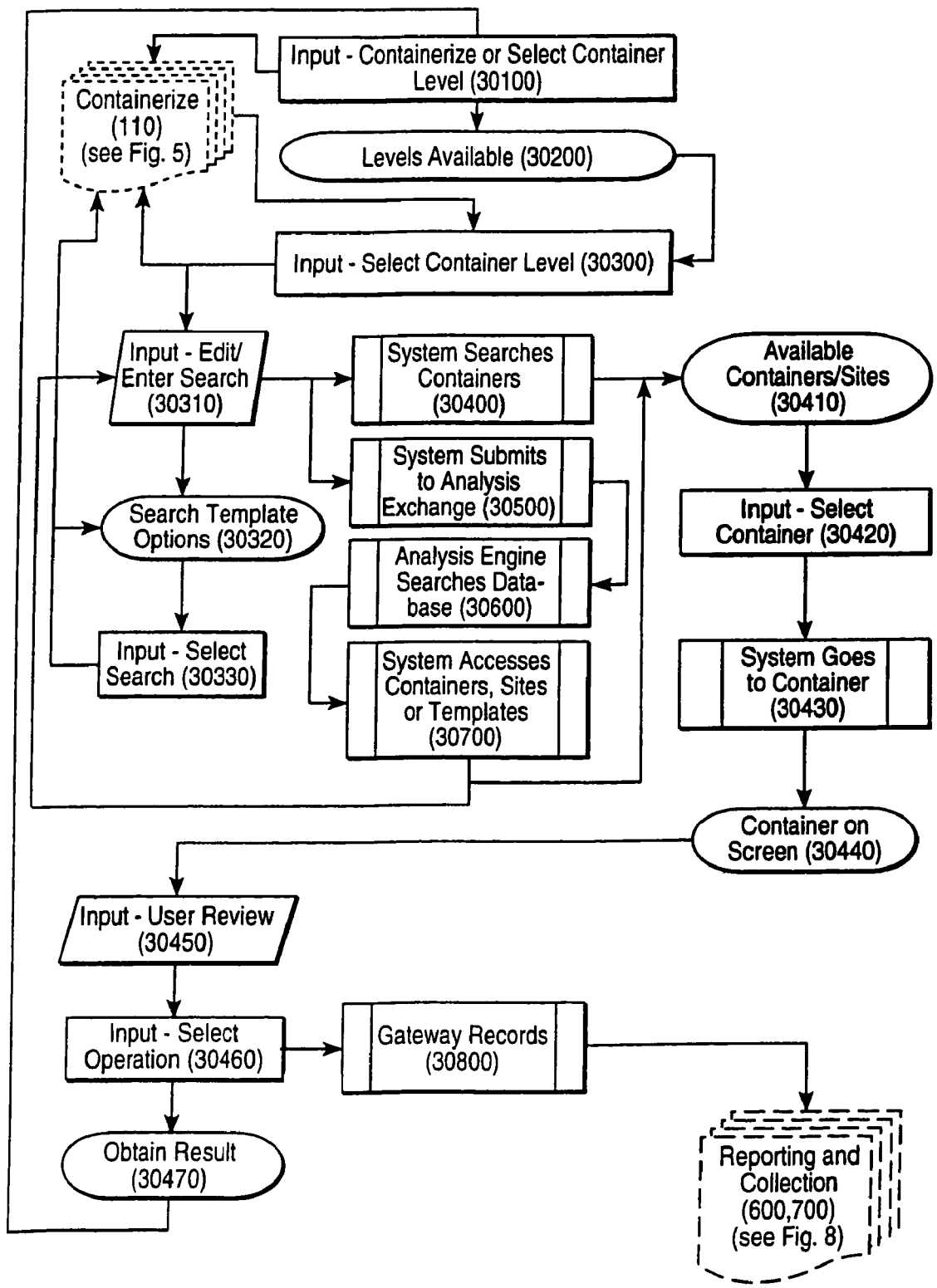
FIG. 6 is a flowchart showing a preferred method for searching for containers within a node.

Referring now to FIG. 6, a flow chart of the method for searching for containers 100.

When input is received from the user selecting "search interface" from the main title bar, the search interface screen appears. The user is given the choice of containerizing selected content or requesting that container levels be displayed 30100. From a drop down menu another menu appears allowing input to be received from the user selecting the container level 30200. Input is received from the user selecting the container level (from the smallest component to the whole system) 30300.

Input is received 30310 from the user selecting the phrases, containers or components, which then are re-submitted to the same process, until the input is received from the user selecting a specific site or container.

The search phrase, whether containerized or not, is submitted simultaneously to the search engine 30400 and the analysis engine 30500.

The screen then reports in a selection menu, the number of applicable sites found by the search engine 30410, the number of historically proven applicable sites found by the analysis engine 30410, the number of historically proven applicable containers at the selected container level or any container level found by the analysis engine 30410, and the number of historically proven new search phrases or digital segments found by the analysis engine 30320. Input is received from the user selecting one of the named sets above 30330. If input is received from the user choosing the search engine, the search interface lists the applicable site titles with a brief description 30410. If input is received from the user choosing the site list of the analysis, the search interface lists the applicable site titles with a brief description 30410. If input is received from the user choosing the container list of the analysis engine, the search interface lists the applicable container titles with a brief description 30410. If input is received from the user selecting a container 30420, the system offers the means to view titles and descriptions of sub-containers at any chosen class level. If input is received from the user choosing the phrase list of the analysis engine, the search interface lists the applicable phrases or digital segments with a brief description 30320. The search and search result cycle repeats until input is received from the user choosing to go to an individual container or site.

Input is received from the user entering text or any digital string describing his search objectives into a text or search box. When input is received from the user submitting the search string, the system provides the option of containerizing the search through the container editor 10. Once the search container 101 is created, the system restores the search interface 300 screen the user.

Input is received from the user selecting "search", "supported search" or "both" from another drop-down menu and from submitting the search. When input is received from the user selecting "search" 30310, the search phrase is submitted to the search engine 30400, which searches both content and the appropriate container registers, as pre-indexed in the search engine, and returns a list of appropriate locations, components or containers. When input is received from the selecting "supported search", the search phrase is submitted to the analysis engine search support, which returns a list, in a drop-down menu, of search phrases or individual containers, for any and all container levels, used by other users or created by the system and known to be historically successful for the described effort and the described searching user, as per the results of the analysis search engine. Input is received from the user selecting a new search phrase or specific container from the drop down menu 30330. When input is received from the user choosing a new search phrase, that phrase is also submitted to the analysis engine 30500 which returns a list of pre-compiled historically proven sites, components or containers associated with that search phrase 30320. Input is received from the user choosing a selection 30420 and the system calls up that specific site, container or component. If input is received from the user selecting a specific site, container or component at any time during the search process, that element is called up by the system 30440.

Figure 8:
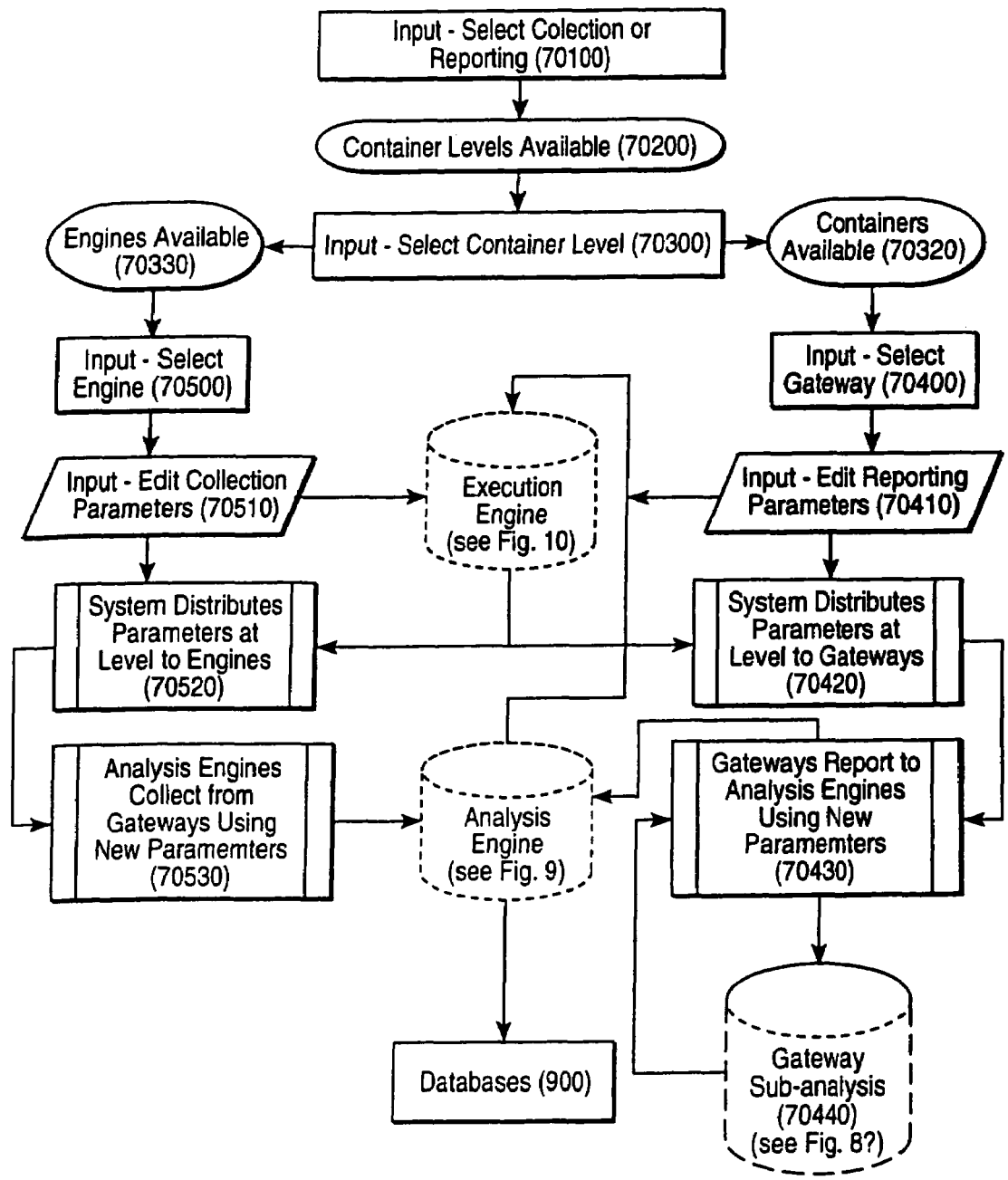
FIG. 8 is a flowchart showing a method for performing the data collection and reporting on containers.

Input is received from the user choosing to containerize a search or select a container level in which to search 30100. When input is received from the user choosing to containerize the search, the software moves to the container editor as described in FIG. 5, and then returns the user to the search interface screen. Input is received from the user selecting to search a specific container level or the whole network. The system shows the available levels 30200. Input is received from the user selecting a container level 30300, and entering the text or digital component comprising the search string 30310. The system searches the containers 30400 while simultaneously submitting the search string to the analysis engine 30500. While the system is accessing containers, sites or templates 30700, the analysis engine 30500 inquires of the appropriate database 30600 to access historically successful containers, sites or search templates corresponding to the search request 30700, which is then shown on another portion or option of the search interface, either as available containers or sites 30410 or as search template options 30320. On one portion or option of the search interface screen the corresponding containers or sites are listed and/or previewed for selection 30410. Input is received from the user selecting the container to access 30420. The system accesses that container 30430 and shows it on the screen 30440 for user review. Input is received from the user selecting an operation, i.e., preview, read, purchase, move, copy, lease, in any composed schedule with operations assigned specific values 30460, and the system obtains the specified result 30470. The selection of the operation including any interaction with any uniquely defined container 100 is recorded 30800 by the container gateway (FIG. 2A, 200), stored in the gateway storage 205 and made available to the analysis engine (FIG. 9) by the data collection and reporting means (FIG. 8). Reporting and collection occurs on a regular basis according to user determined times or rules. The analysis engine compiles and analyzes selections according to various rules-based systems applicable to the particular container area of residence in cyberspace.

Input is received from the user selecting the container or site 30410, proceeding as described above, or selecting a search template 30330, and editing it to re-enter the search 30310. All operations on FIG. 6 utilize the communication device 26 whenever necessary or expeditious.

Figure 7:
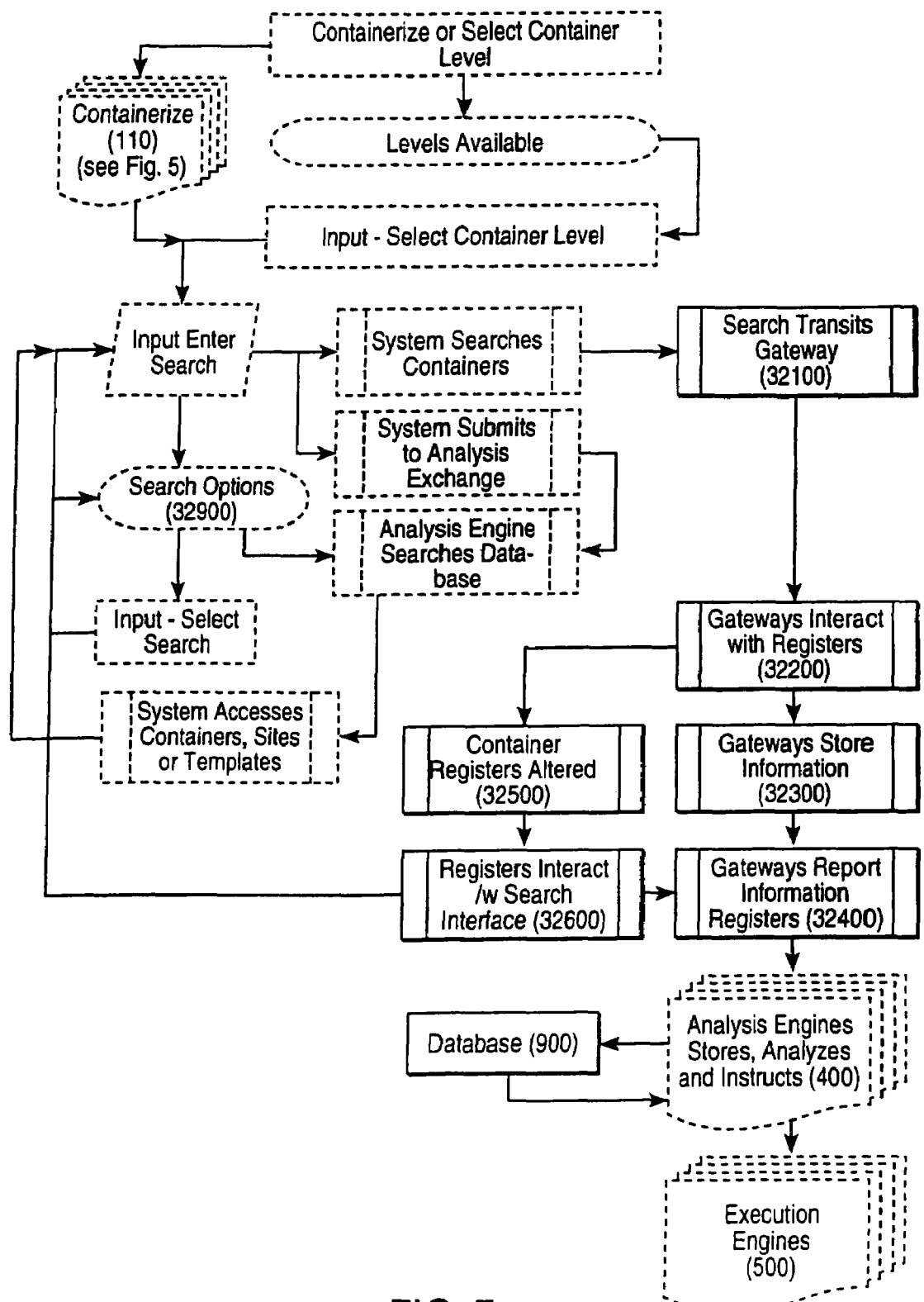
FIG. 7 is a flowchart further showing a preferred method for searching for containers over one or more gateways.

Referring now to FIG. 7, a flow chart of the search process is shown. Steps in FIG. 7 repeated from FIG. 6 are given the same reference number as in FIG. 6 for convenience and ease of understanding. FIG. 7 commences with "SEARCH TRANSITS GATEWAY 32100", continuing from FIG. 6, "SYSTEM SEARCHES CONTAINERS 30400". The submitted search 32100 transits the gateway 200. The gateway 200 interacts with the container registers 32200. The gateways 200 store the information downloaded from the registers 32300, and the container registers are altered 32500. The container registers 120 then interact with the registers 120 of the encapsulated search, which registers, and the values set within, have been constructed and appended to the search through the search interface 32600. Values are exchanged and compared and operations performed under the rules governing both interacting containers 100, and the rules governing the search container 100 and any gateway 200. The search engine 320, operating under the principles and means of search engines presently existing as described elsewhere, then provides to the search interface 32600 a list of containers 100 meeting the requirements of the search and its appended registers, as well as additional search options 32900. The gateway 200 reports and makes available for collection to the analysis engine 400 the information obtained from the interaction 32400. On a periodic basis defined by the user or a rules-based system, the analysis engine 400 (FIG. 9) stores in databases 900, analyzes and instructs the execution engine 500, and the execution engine 500 executes changes in the system components as defined below (FIG. 10). All operations on FIG. 7 utilize the communication device 26 whenever necessary or expeditious.

On the remaining figures, shapes referring to other figures, to operations external to the scope of the present figures, or to the subject of the present drawing, are indicated with dashed lines, and are shown only to place the described operations in the context of continuous and continual operations external to the drawing.

Referring now to FIG. 8, a flow chart of the preferred process for collecting and reporting information on containers is shown. The data reporting 600 and data collection 700 means utilizes subroutines within the analysis engines 400 and gateways 200 to submit and collect register information and sub level analysis to other analysis engines 400 or other gateways 200 of a higher (larger) logical set in a set pattern and frequency defined by the administrator.

Input is received from the user selecting "data reporting" 70100 from the "edit gateway" drop-down menu. Container levels are displayed 70200. Input is received from the user selecting container level 70300. A menu of all possible gateways 70320 and analysis engines 70330 residing on gateways on the above defined container class appears, depicted graphically as a tree of analysis engines and gateways at that container level. Input is received from the user selecting "source" from "source or destination." Input is received from the user 70400 selecting a container, containers, or class of container by clicking on the graphically depicted container(s) or container level on a display device. Input is received from the user 70410 selecting "destination" from "source or destination" Input is received from the user 70500 selecting an analysis engine, analysis engines, or class of analysis engine by clicking on the graphically depicted analysis engine(s) or analysis engine level on a display device. A time scheduler is displayed. Input is received from the user 70510 selecting the reporting frequency for the selected gateways to report data to the selected engines. The data from the gateways is thenceforth continuously moved or copied to the analysis engines by the system 10 utilizing the execution engine 500 according to the defined schedule, rules and pattern 70420, 70520.

Input is received from the user selecting "choose container level" 70300 from the gateway editor drop-down menu. A menu 70320 appears listing the classes of containers on the system within the defined subset and superset scheme of multiple hierarchically nested containers, i.e.; element, document, file, database, warehouse, domain, appears. Input is received from the user selecting the class of containers. A graphic representation of that container level throughout the system appears. Input 70300 is received from the user selecting individual containers or all the containers in that class.

From the gateway editor drop-down menu input 70100 is received from the user selecting "data collecting" A menu of all possible gateways and analysis engines residing on gateways on the above defined container class appears, depicted graphically as a tree of analysis engines, and gateways at that container level. Input 70510 is received from the user selecting "source" from "source or destination." Input is received from the user selecting a container, containers, or class of container by clicking on the graphically depicted container(s) or container level. Input 70510 is received from the user selecting "destination" from "source or destination." Input 70510 is received from the user selecting an analysis engine, analysis engines, or class of analysis engine by clicking on the graphically depicted analysis engine(s) or analysis engine level. A time scheduler appears. Input 70510 is received from the user selecting the collecting frequency for the selected engines to collect data from the selected gateways. The data from the gateways is thenceforth continuously moved or copied to the analysis engines by the system 10 utilizing the execution engine 500 according to the defined schedule, rules and pattern.

The data collection 700 means, utilizing the communication device 26 and an execution engine 500, comprises one or more subroutines or agents programmed to travel through the network collecting the accumulated data and analyses from selected analysis engines, gateways or selected subset level of analysis engines or gateways (as above) in a pattern and frequency defined by the gateway administrator at a given container level. Input 70510 is received from the user or administrator, defining the collection and reporting of data, thus controlling permission within his gateway, and being subject to permission levels defined by others beyond his gateway.

Input is received from the user or gateway administrator selecting collection or reporting 70100 and the system shows the container levels available 70200. Input is received from the user selecting a container level 70300. Input is received from the user selecting "gateway" 70400 or "engine" 70500. The system shows gateways 70320 or engines 70330 associated with that level. Input is received from the user editing the reporting parameters associated with a gateway or a class of gateways 70410 or an engine or class of engines 70510. Input is received from the user selecting the collecting frequency for the chosen engines. When input is received from the user choosing to user save the definition, the screen returns to the main container screen, step 70100 to make another selection available. Input is received from the user choosing to repeat the cycle, choosing "destination" to describe the destination analysis engines and the data collecting frequency from those destination analysis engines. The data collection means 700 collects the accumulated gateway information in a pattern and frequency defined by the gateway administrator or user at a given container level.

The system utilizing the execution engine (see FIG. 10) distributes the new parameters to the gateways 70420 or engines 70520 by the communication device 26. Using the new parameters the gateways report to the analysis engines 70430 after, in some cases, conducting sub-analysis 70440, or using sub-analysis 70440 to submit directly to specified gateways under certain conditions and parameters, and the analysis engines collect from the gateways 70530. The analysis engine uploads, downloads and utilizes information to databases 900 to conducts its analysis.

The invention includes an analysis engine 400. Through the data reporting 600 means and data collection 700 the analysis engine 400 receives data and sub-analysis from the search interface and the gateways. Data includes, for each gateway 200, the frequency and grade of access, the description of the user accessing, the identity of the container 100 accessing, the register parameters, and the historically accumulated register data.

Figure 9:
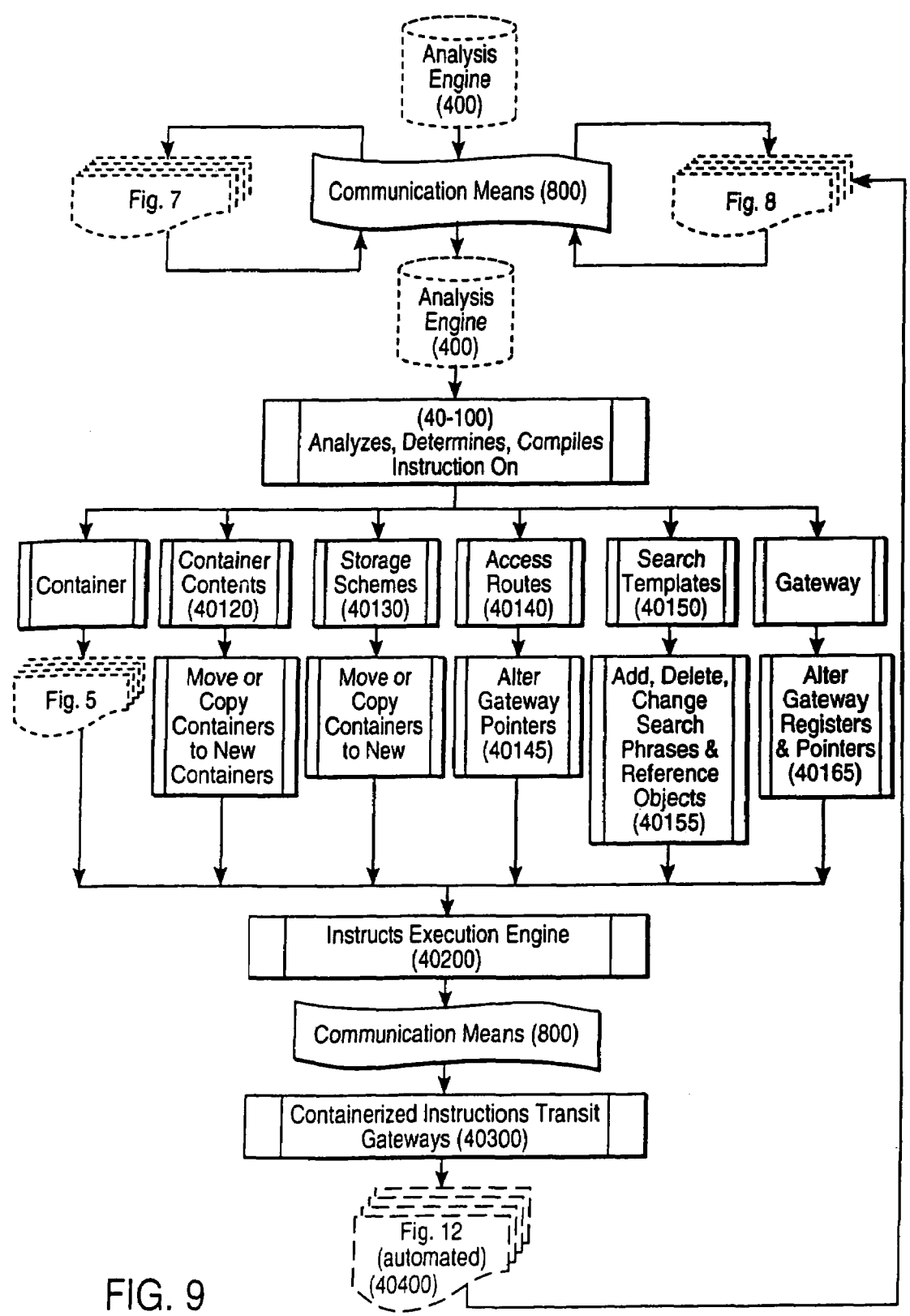
FIG. 9 is a flowchart showing the operation of the analysis engine.
Figure 10:
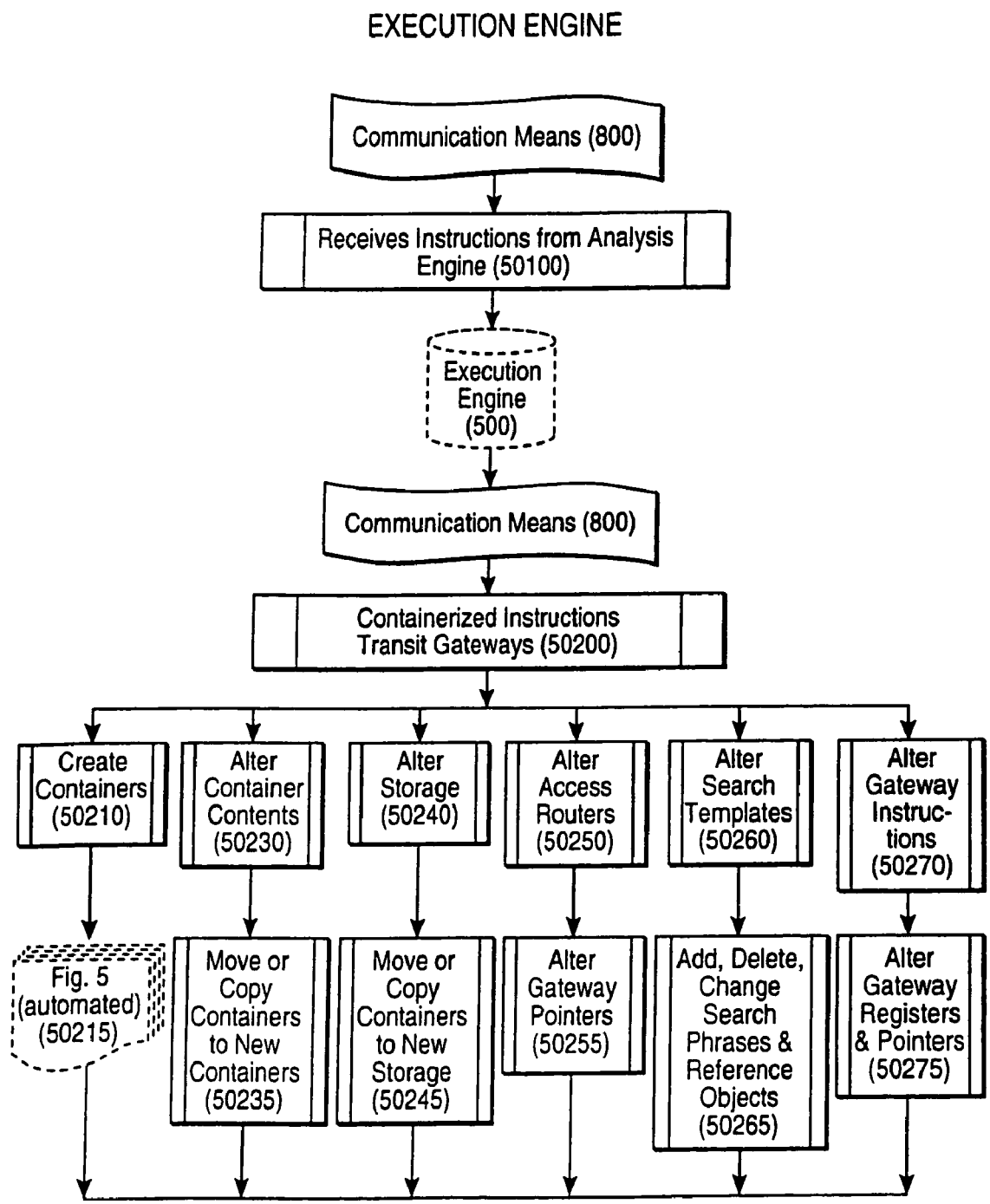
FIG. 10 is a flowchart showing the operation of the execution engine.

Referring now to FIG. 9, a flow chart of the operation of the analysis engine 400 is shown. Analysis engines 400 may reside at any gateway or anywhere in the system 10. The analysis engine 400, operating under its own programmed sequence, utilizing the communication device 26, works, by means of programmed rules of logical, mathematical, statistical or other analysis upon gateway and register information, in continuous interaction with the search process 410 and the data collection and reporting process 420 to analyze, determine and compile instructions 40100 on container construction 40110 to containerize in an automated process 40115, on container contents 40120 to move, copy or delete containers 40125, on storage schemes 40130 to move or copy containers to new storage 40135, on access routes 40140 to alter gateway pointers to sought information 40145, on search templates 40150 to add, delete or change search phrases and the referenced objects indicated by those search phrases 40155 and on gateway instructions 40160 to alter gateway registers and pointers 40165.

Thus, analyses might include, but are not limited to, the physical locus of the users accessing, the demographic classification of the users accessing, the access frequency for a given container, the range or curve of time relevance affecting a container, the range or region of space relevance affecting a container 100, the number or number of a specific type of container 100 transiting a gateway 200, the hierarchically graded usage of containers 100 or container contents 01 compared with the demographic of those users accessing the container, the hierarchically graded usage of containers 100 or container contents 01 compared with search phrases entered into the search interface 300, the hierarchically graded usage of containers 100 or container contents 01 compared with search phrases entered into the search interface 300 compared with the demographic of the users accessing, the number of pertinent containers nested within a given container 100. Once an analysis is accomplished, the result is compared to pre-programmed rules triggering instruction sets (such as moving a container to nest within another container).

Figure 12:
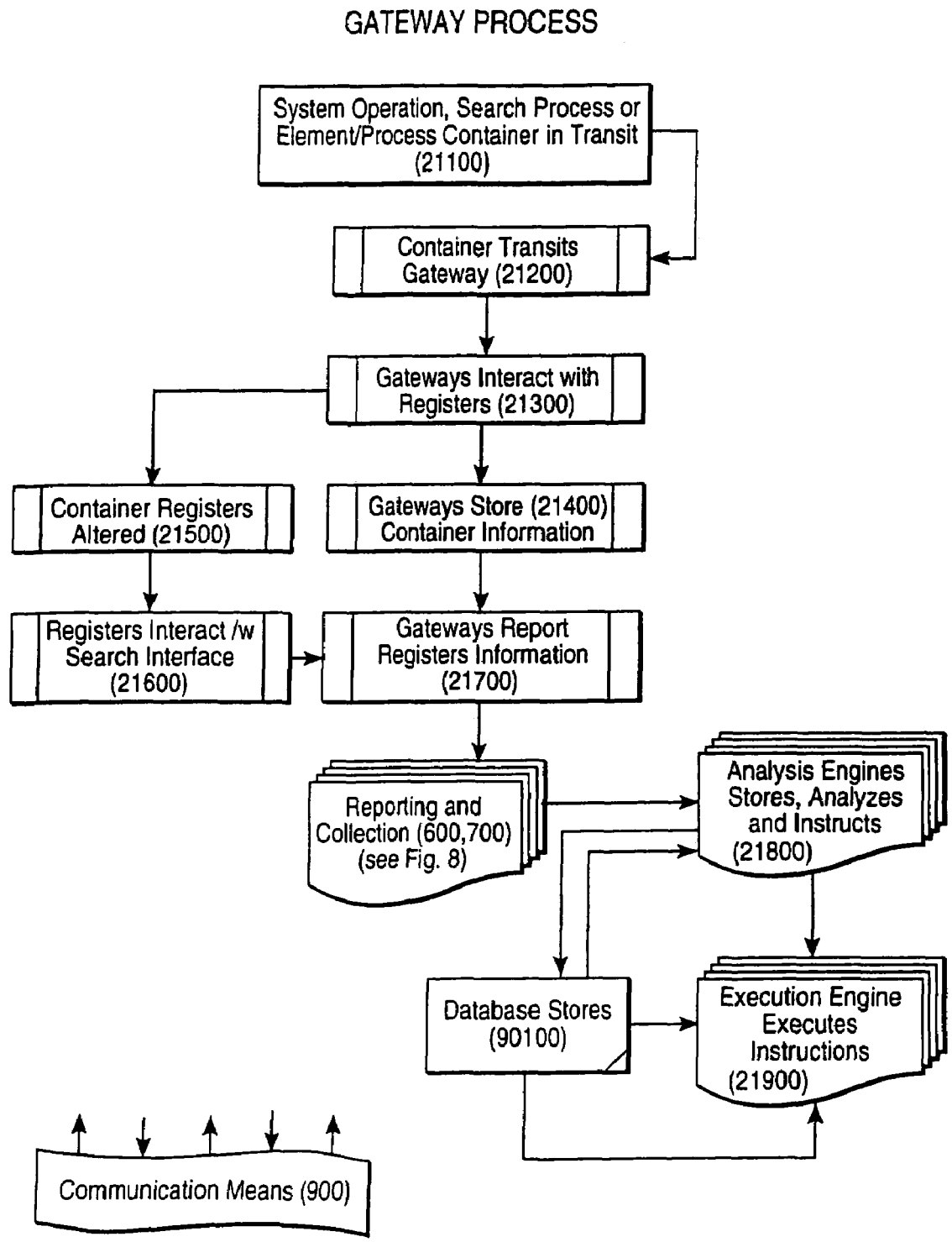
FIG. 12 is a flowchart showing the operation of the gateway process.

Instructions are then sent to the execution engine 40200, which utilizes the communication device 26 to execute the instructions derived from the analyses. These containerized instructions transit the gateways 40300 and are utilized in the gateway process (FIG. 12)

Referring now to FIG. 10, a flow chart of the operation of the execution engine is shown. The execution engine 400, operating under its own programmed sequence in response to the instructions from the analysis engine 50100, utilizing the communication device 26, works in continuous process as its containerized execution instructions transit the gateways 50200 to create containers 50210 in an automated containerization process 50215, alter container contents 50230 by moving or copying containers to new containers 50235, to alter storage 50240 by moving or copying containers to new storage 50245, to alter access routes 50250 by altering gateway pointers 50255, to alter search templates 50260 by adding, changing and deleting search phrases and the referenced objects indicated by those search phrases 50265, to alter gateway instructions 50270 by altering gateway registers and pointers 50275. The execution works in a continuous loop with the gateway process 50300, the data collection and reporting process 50400 and the analysis engine process 50300.

The invention includes gateways 200. Gateways may be placed and reside anywhere on the network where containers transit. Gateways also reside on any or all containers. The gateway reads and stores the chosen register information from transient containers entering or exiting its logical boundaries. The resident analysis search engine, if any, performs the specified level of analysis. Data and analysis is both held for the collection means according to the pattern and timing specified in the data reporting 600 editor and submitted according to the pattern and timing specified in the data collection means editor 700.

The gateways are network-wide, hierarchical, and nestable, and reside with a container encompassing any component, digital code, file, search string, set, database, network, event or process and maintaining a unique lifelong network wide identity and unique in all the universe historical identity, or may be strategically placed at such container transit points to gather and store register information attached to any such container, according to system-defined, system-generated, or user determined rules residing in its registers defining the behavior of those containers and components as they exit and enter one another, or interact with one another or any system process or system component within the logical domain of that container, or after exiting and entering that container, or defining how they interact with that unique gateway.

Gateway's registers comprise both system-defined and user-defined registers, alterable by author, duration, location, network-wide history, individual container history and/or interaction with other containers, gateways, networks or media, and evolve according to that gateway's history on a computer network, or according to the network history of events and processes, or according to that information component's interaction with other information containers, components, system components, network events or processes.

Referring now to FIG. 1, a flow chart of the gateway editor is shown. From the main title bar input is received from the user selecting "containerize" or "gateway level" 20100. When input is received from the user selecting "containerize" the system enters the container editor process 110. When input is received from the user selecting "gateway," the system shows the gateway levels available 20200. A menu of all possible gateways within the subset and superset scheme of defined multiple hierarchically nested gateways appears. Input is received from the user selecting the gateway level 20300. The system searches the gateways 20500 to locate the available gateway templates 20700 and the available gateways 20600. Input is received from the user selecting the gateway 20610 or gateway level template 20720. The system goes to the gateway 20620 or to the template 20720. A graphic representation of the chosen gateway 20630 or template 20730 appears. Input is received from the user to edit 20640 or create a gateway 20740. Once completed, input may be received from the user selecting "analysis level" from the gateway 200 drop-down menu, to select the level of analysis in a multi-level analysis sequence to be accomplished at the local level by a gateway-resident analysis engine. The user accesses the container editor to containerize (FIG. 5). Input is received from the user selecting the registers by clicking on the graphically depicted register, or from a drop down menu. Input is received from the user setting the registers as described elsewhere in ("container registers"). Input is received from the user selecting or defining the rules governing the interaction of that gateway with transient containers. Input is received from the user selecting or defining the rules governing the interaction of containers existing within the logical domain of the container 100 to which that gateway is attached. The user publishes the gateway (FIG. 5). Input is received from the user selecting "residence" from the main menu bar.). Input is received from the user choosing to leave the gateway where it was created, move it to container on another drive, directory, computer, or network. If the user chooses "move," a browse function allows the user to name the new location or browse a list of possible locations. Once input is received from the user choosing the residence of the gateway, the program restores the search interface screen.

The invention includes a data reporting means editor 610, and a data collection means editor 710, FIG. 2A, as a menu option under the gateway editor 210.

The present invention also includes a gateway process.

Referring now to FIG. 12, a flow chart of the gateway process is shown. A system operation, search process or element container or process container is shown in transit 21100 passing through a gateway 21200. The container, operation or process interacts with the gateway 21300, uploading, downloading and exchanging information with the container, operation or process. The gateway stores container information 21400 and the container registers are altered 21500. The container registers also interact with the search interface 21600. The gateways report the register information or make it available for collection by the data reporting and collection means (FIG. 8) operating on the communication device 26 to provide the information to the analysis engine 21800, which stores 90100, analyzes and instructs the execution engine 21900, which processes and instructions are also stored 90100 by the execution engine upon receipt.

All operations in FIG. 12 utilize the communication device 26 whenever necessary or expeditious.

Figure 13A:
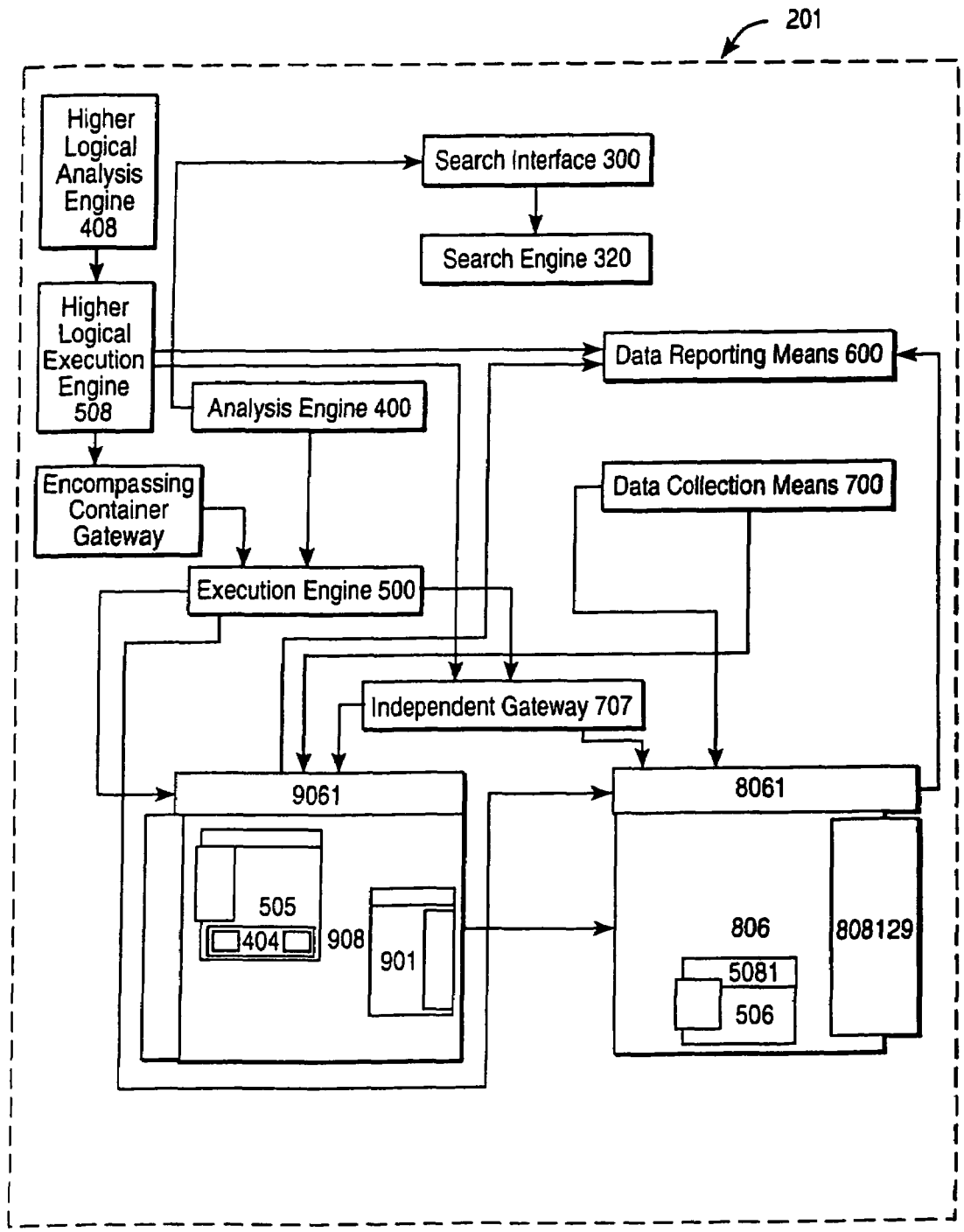
FIG. 13A is a drawing showing an example of nested containers, gateways, registers, analysis engines and an execution engine prior to container reconstruction as depicted in 13 B, 13 C and 13 D.

Referring now to FIG. 13A, a drawing of nested containers 100 prior to the container modification process on a network 201 is shown. (Note: The same container numbering scheme is used in FIGS. 13 A, 13 B, 13 C, 13 D and in 2 B.) Information containers 505 and 909, residing within container 908, operating under the rules governing container interaction within that container 908 downloaded to container 505 and 909 from gateway 9081 upon their entrance to container 908, which rules had been downloaded from execution engine 500 acting under the direction of analysis engine 400, and under the rules programmed into their own registers 404120, 909120, compare the specified (by those rules) set of registers 404120, 909120, i.e., time and space, and determine a container 404 encapsulated within 505 would be more appropriately encapsulated within container 909.

Figure 13B:
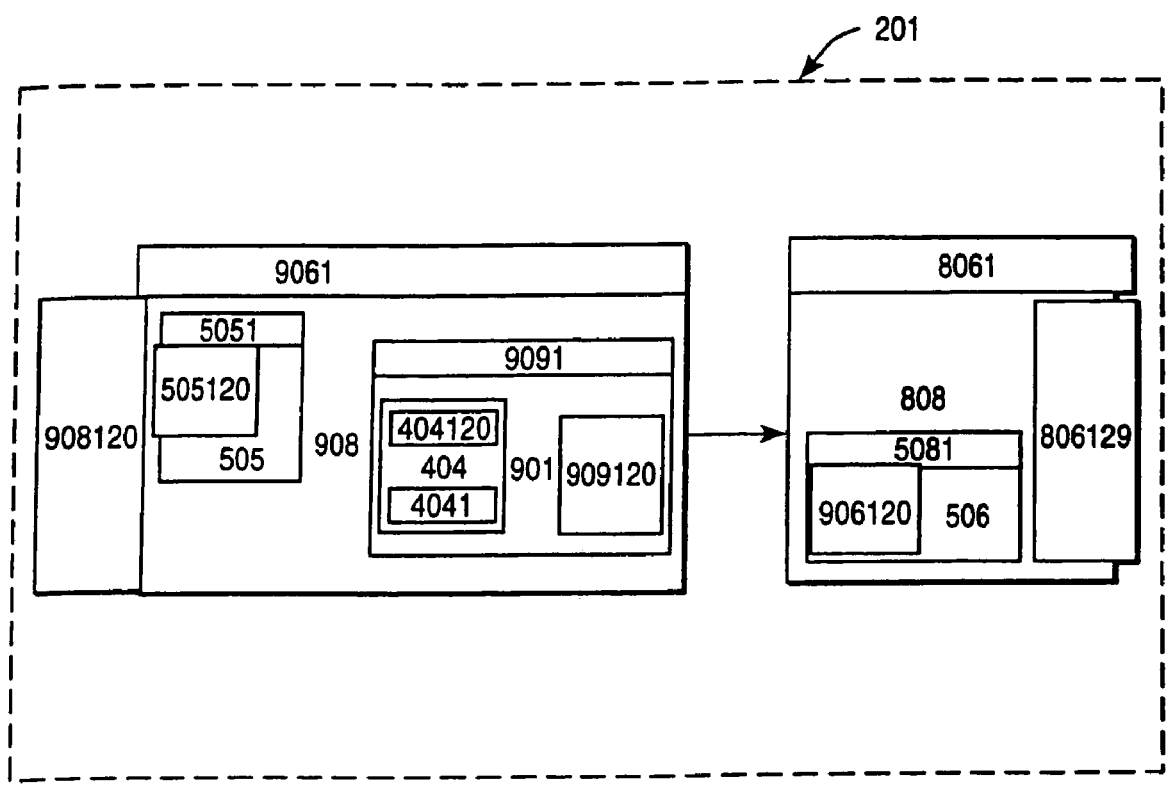
FIG. 13B is a drawing showing the reconstructed nested containers of FIG. 13A.

Referring now to FIG. 13B a drawing of nested containers during a container modification process on a network 201 is shown. Container 404 is moved to reside with container 909. As the container 404 exits container 505, the gateway of container 505, being gateway 5051, operating under the rules governing container interaction with a gateway 5051 upon egress or egress as programmed in the gateway editor 210 and modified by the execution engine 500 executing the instructions of the analysis engine 400, or any greater logical analysis engine 408 providing execution instructions to an execution engine 508 operating in a larger encompassing container 108 entering through that container's gateway 208 or an independent gateway 707, or sub-analysis engine operating at any gateway level, records the register information of container 404. The gateway 5051 reports the transaction to the gateway 9081 of container 908, being the next higher logical container. Gateway 9081 holds in gateway storage 205 the information until collected by one or more data collection processes 700, or reported to one or more data reporting processes 600, serving one or more analysis engines 400 residing independently on the system 10 or an analysis engine at higher logical container 303. The analysis engine 400, comparing reports of user hierarchically graded usage under the operations of the search engine 320 and the search interface 300, on information container 808 after receiving reports from the data reporting means of container 404 being moved to container 909 determines, i.e., that the number of time and space relevant containers residing within container 909 is sufficient to warrant an action, and directs the execution engine 500 to copy container 909, nested within container 908, to a third information container 808. As the copy instruction from execution engine 500 transits the gateway of container 908, the gateway 9081 records the instruction. The copy instruction interacts with the registers 909120 of container 909 regarding the rules governing its copying to another location. Once approved by the governing rules of registers 909120 appended to container 909, container 909 is duplicated. As the duplicate container 909 exits the container 908, the gateway records the register information 909120 of container 909, and the registers 909120 of container 909 are altered by special instructions from gateway 9081 under the rules residing in gateway 9081 regarding ingress and egress and the rules residing in the registers 909120 of container 909 regarding alteration by gateways upon ingress and egress. Passing through independent gateway 707, the register information 909120 is recorded, and awaits data collection or reporting 700, 600. As container 909 enters container 808, the gateway records the register information 909120 of container 909, the registers 909120 of 909 are altered by special instructions from gateway 8081, operating under the rules as described in the paragraph above, and container 909 takes up residence within container 808.

Figure 13C:
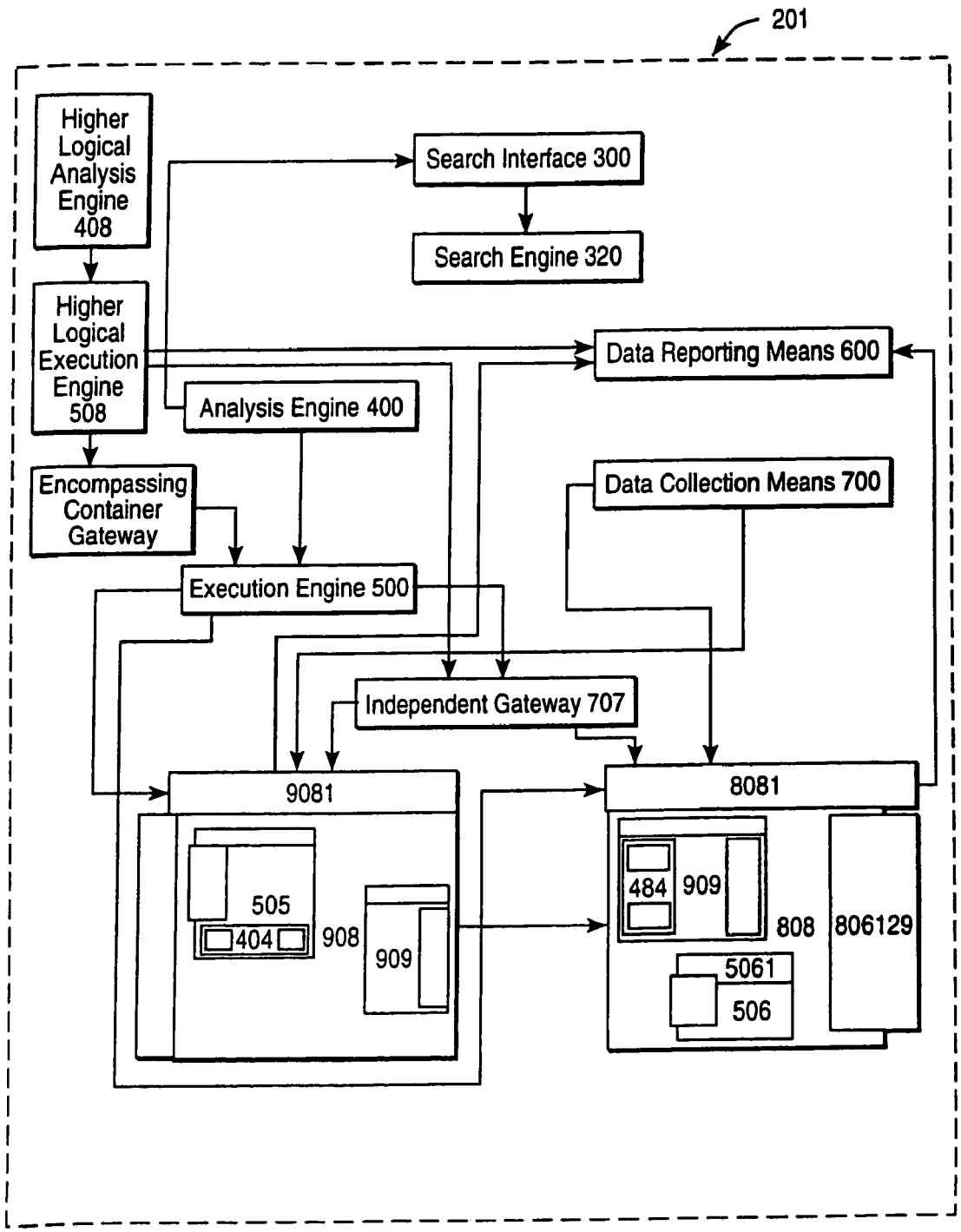
FIG. 13C is a drawing showing further reconstruction of nested containers, with a container relocated to reside within another container.

Referring now to FIG. 13C, a drawing of nested containers after the container modification process on a network 201 process is shown. Container 909, now also logically residing within container 808, commences to interact with other containers 606 in 808 under the rules governing container interaction within container 808 as received from gateway 8081 upon transiting that gateway, and under the rules of registers 606120, 909120 of the interacting containers 606, 909, operating under the rules as described in the paragraph above. Through data collection and reporting 700, 600, analysis engine is appraised of container's 909 new duplicate residence. I.e., operating under the registers of space relevance, a body of law pertaining to Boston Municipal tax law may be housed in a container holding Massachusetts tax law, but it would be more appropriately located in a container holding Boston tax law, with only a pointer to that location residing in the Massachusetts tax law container. In this example, such an analysis could be accomplished by comparison of zip code information in the space registers, or logical rules-based analysis, with "state" being a larger set than "city". Or, i.e., operating under the registers of time relevance, the curve of time relevance for a concert might follow an ascending curve for the months prior, hit a brief plateau, and then reach a precipitous decline, at which time certain pertinent information only might be moved to an archival container of city events or rock concerts of that year. In this example, once the curve is mapped into a register, that map would cause an increasing frequency of pointers to that container in other containers or gateways, or inclusion of that container in other containers, as the analysis engine compares that curve with increasing user inquiry.

Figure 13D:
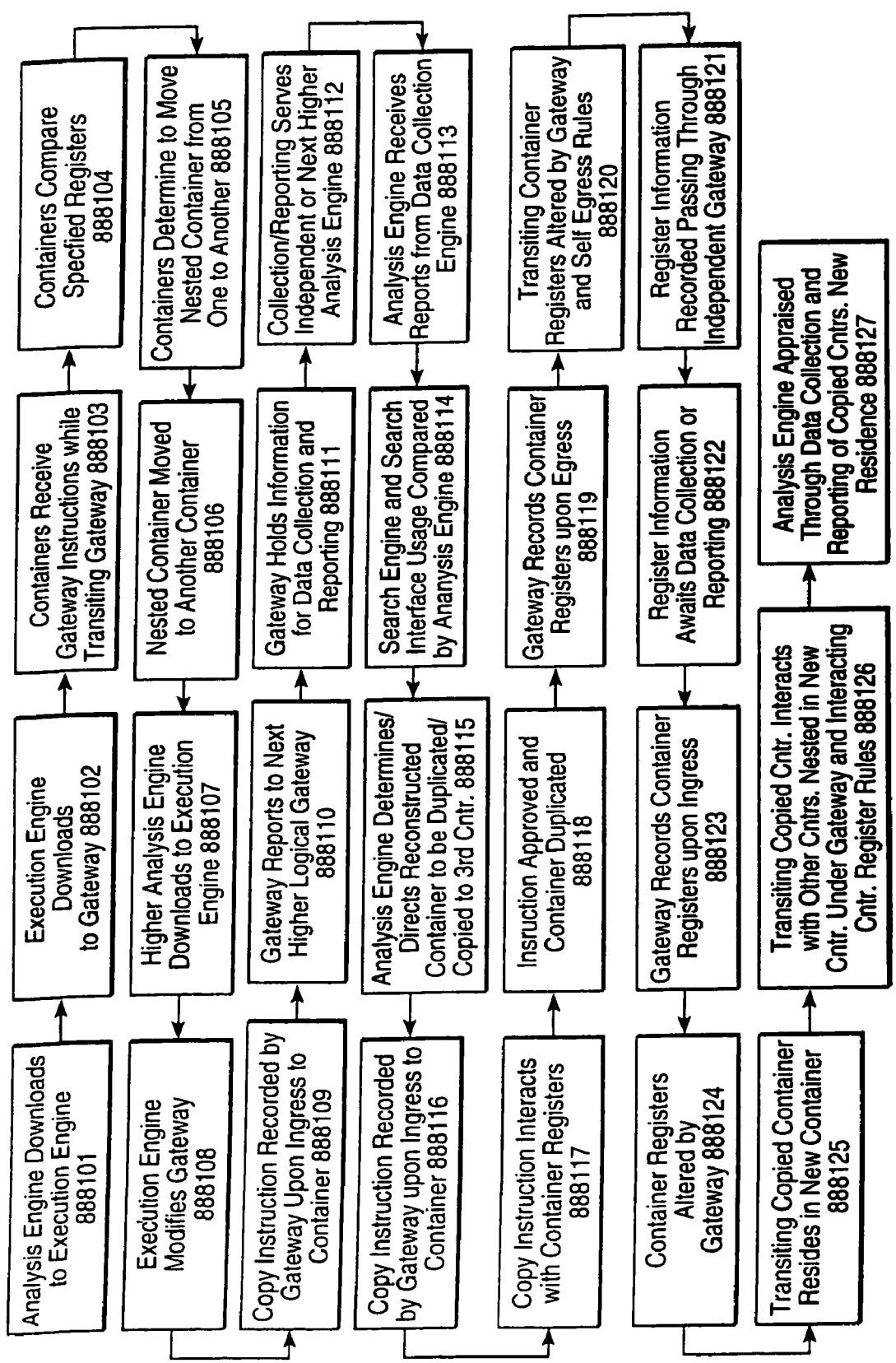
FIG. 13D is a drawing showing a flowchart of the reconstruction process

Referring now to FIG. 13D, a flowchart of the reconstruction process is shown.

Information containers 505 and 909, residing within container 908, operating under the rules governing container interaction within that container 908 downloaded 888103 to container 505 and 909 from gateway 9081 upon their entrance to container 908, which rules had been downloaded 888102 from execution engine 500 acting under the direction 888101 of analysis engine 400, and under the rules programmed into their own registers 404120, 909120, compare 888104 the specified (by those rules) set of registers 404120, 909120, i.e., time and space, and determine 888105 a container 404 encapsulated within 505 would be more appropriately encapsulated within container 909.

Container 404 is moved 888106 to reside with container 909. As the container 404 exits container 505, the gateway of container 505, being gateway 5051, operating under the rules governing container interaction with a gateway 5051 upon egress or egress as programmed in the gateway editor 210 and modified 888108 by the execution engine 500 executing the instructions of the analysis engine 400, or any greater logical analysis engine 408 providing execution instructions 888107 to an execution engine 508 operating in a larger encompassing container 108 entering through that container's gateway 208 or an independent gateway 707, or sub-analysis engine operating at any gateway level, records 888109 the register information of container 404, and alters the register information of container 404. The gateway 5051 reports 888110 the transaction to the gateway 9081 of container 908, being the next higher logical container. Gateway 9081 holds 888111 in gateway storage 205 the information until collected by one or more data collection processes 700, or reported to one or more data reporting processes 600, serving 888112 one or more analysis engines 400 residing independently on the system 10 or an analysis engine at higher logical container 303. The analysis engine 400, comparing 888114 reports of user hierarchically graded usage on information container 808 under the operations of the search engine 320 and the search interface 300, after receiving 888113 reports from the data reporting means of container 404 being moved to container 909, determines 888115, i.e., that the number of time and space relevant containers residing within container 909 is sufficient to warrant an action, and directs 888115 the execution engine 500 to copy container 909, nested within container 908, to a third information container 808. As the copy instruction from execution engine 500 transits the gateway of container 908, the gateway 9081 records 888116 the instruction. The copy instruction interacts 888117 with the registers 909120 of container 909 regarding the rules governing its copying to another location. Once approved 888118 by the governing rules of registers 909120 appended to container 909, container 909 is duplicated 888118. As the duplicate container 909 exits the container 908, the gateway records 888119 the register information 909120 of container 909, and the registers 909120 of container 909 are altered 888120 by special instructions from gateway 9081 under the rules residing in gateway 9081 regarding ingress and egress and the rules residing in the registers 909120 of container 909 regarding alteration by gateways upon ingress and egress. Passing through independent gateway 707, the register information 909120 is recorded 888121, and awaits 888122 data collection or reporting 700, 600. As container 909 enters container 808, the gateway records 888123 the register information 909120 of container 909, the registers 909120 of 909 are altered 888124 by special instructions from gateway 8081, operating under the rules as described in the paragraph above, and container 909 takes up residence 888125 within container 808.

Container 909, now also logically residing (in addition to its original container residence) within container 808, commences to interact 888126 with other containers 606 in 808 under the rules governing container interaction within container 808 as received from gateway 8081 upon transiting that gateway, and under the rules of registers 606120, 909120 of the interacting containers 606, 909, operating under the rules as described in the paragraph above. Through data collection and reporting 700, 600, analysis engine is appraised 888127 of container's 909 new duplicate residence.

Figure 14:
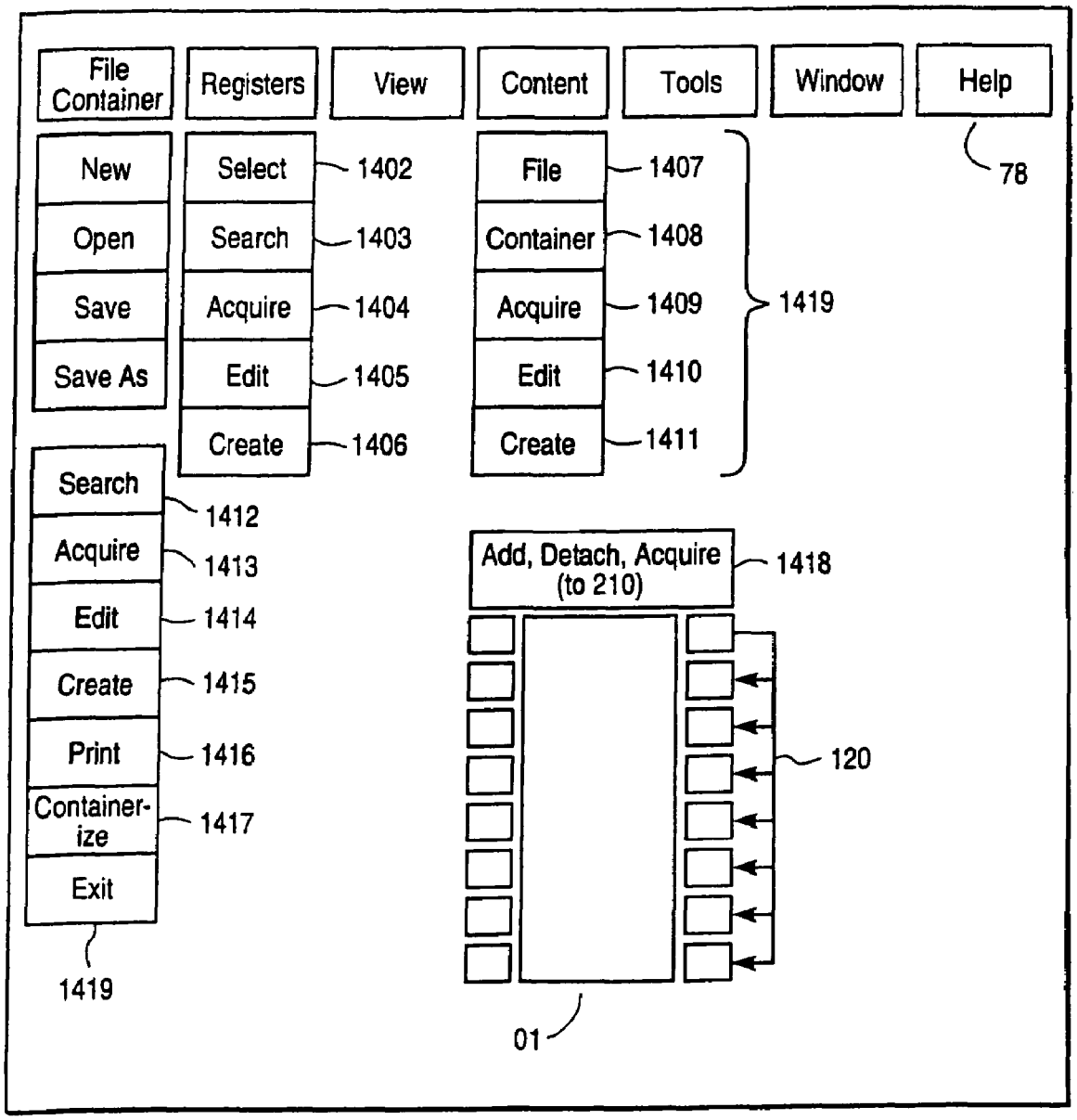
FIG. 14 is a drawing showing the screen interface of the container editor.

Referring now to FIG. 14, the screen interface of the container editor is shown. This interface is a process wherein input is received by the user using the main menu 78 or drop down menu 1419, or using an input device to "drag and drop" or click, causing the system 10 to acquire 1409, edit 1410 or create 1411 a file 1407, container 1408 or digital content 01, to search for 1412, acquire 1413, edit 1414 or create 1415, print 1416, or containerize 1417 a container 100, to select 1402, (or by clicking on register), search 1403, acquire 1404, edit 1405, or create a register 1406 to append or detach registers 120 to those containers, to set register values in those registers 120, to utilize the register editor 125 through 1405 to create new registers, or to 1418 add, detach, acquire a gateway 200 to append or detach to those containers, and utilize the gateway editor 210 through 1418. (See detailed description referring to FIG. 5)

Figure 11:
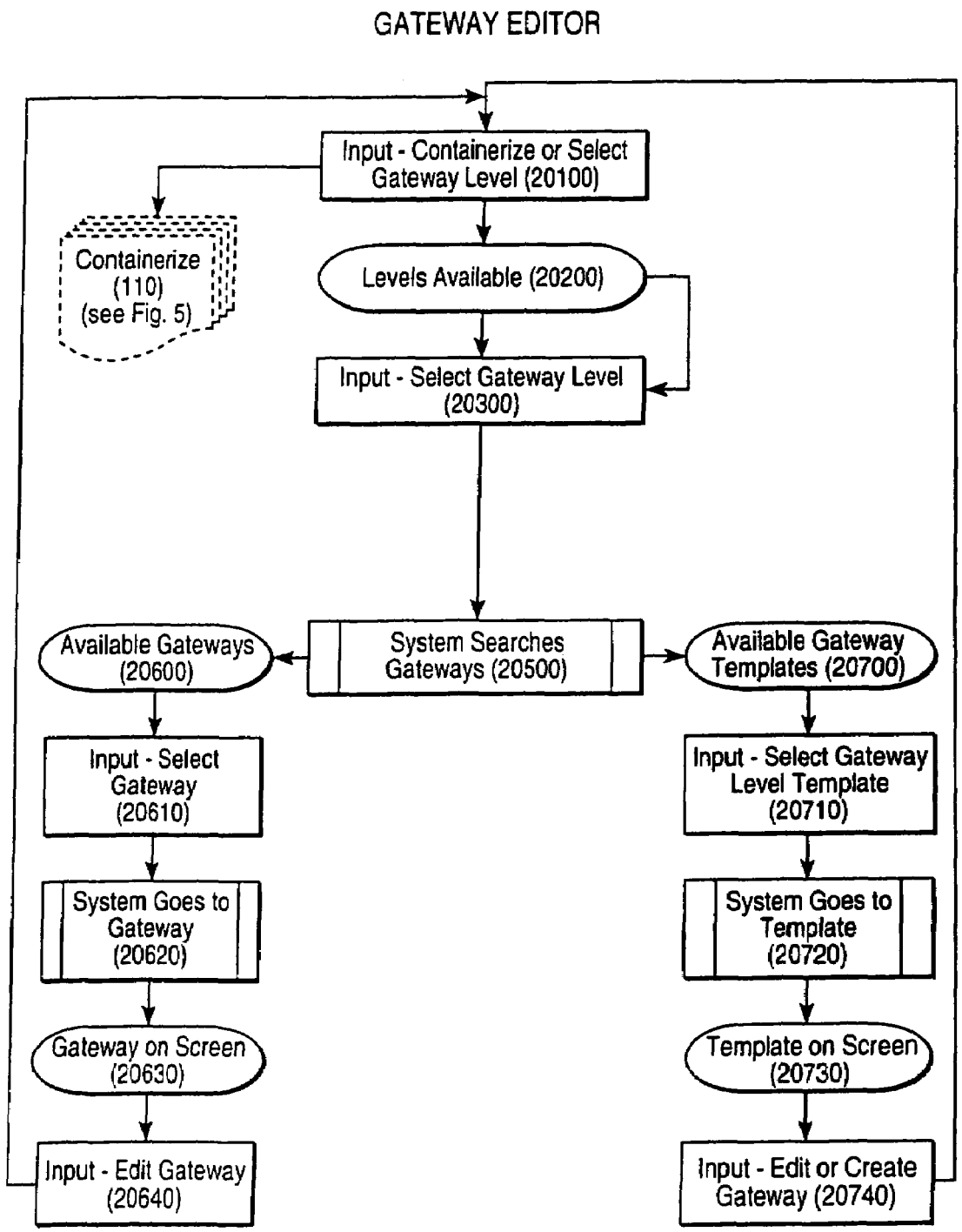
FIG. 11 is a flowchart showing the operation of the gateway editor.
Figure 15:
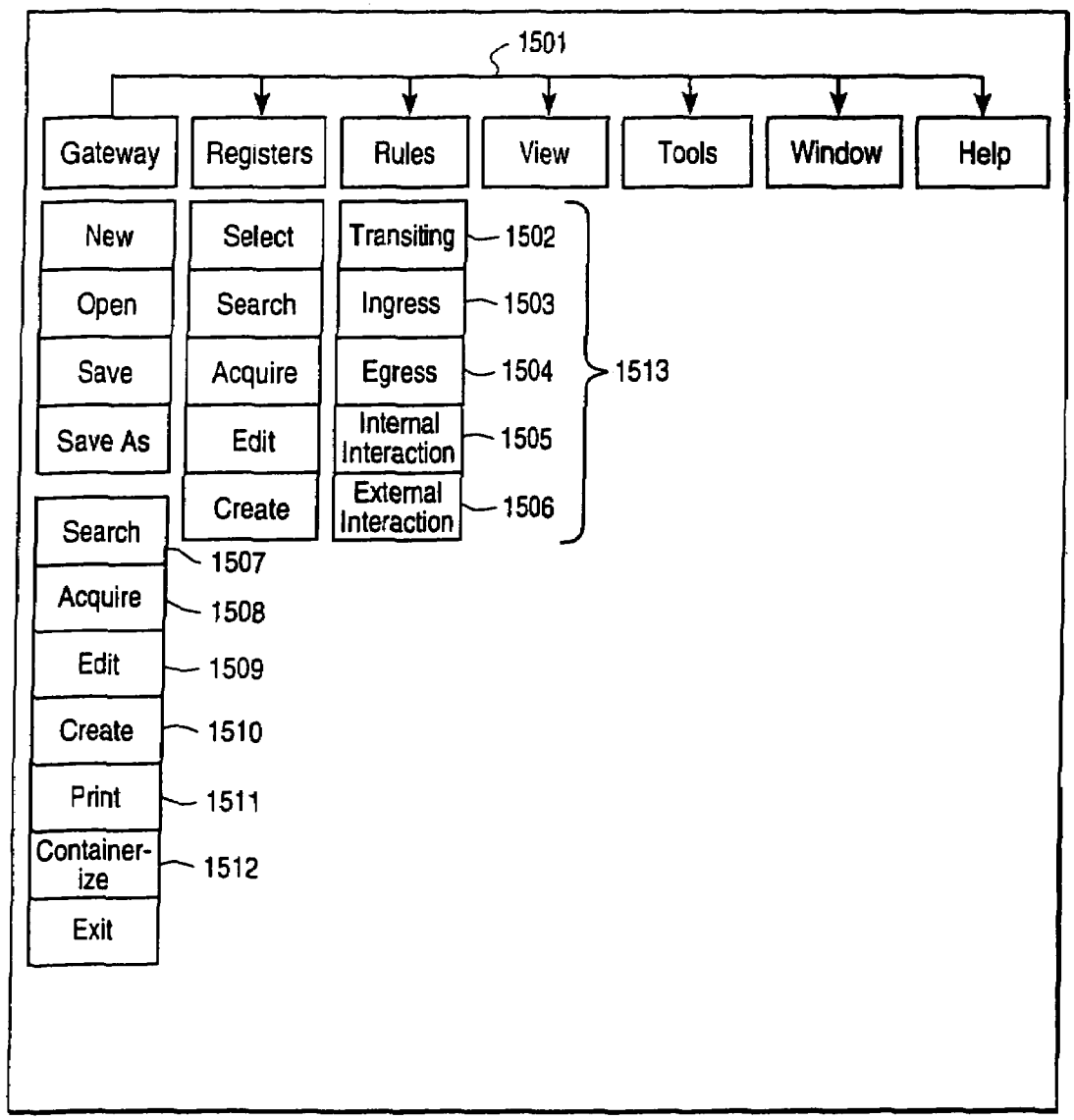
FIG. 15 is a drawing showing the screen interface of the gateway editor.

Referring now to FIG. 15, the screen interface of the gateway editor is shown. This interface is a process wherein input is received by the user using the main menu 1501 or drop down menu 1513, or using an input device to "drag and drop" or click, causing the system 10 to search for 1507, acquire 1508, edit 1509 create 1510, print 1511 or containerize 1512 gateways, and causing the system 10 to establish rules by which an individual gateway governs the transiting 1502, entering 1503, exiting 1504 of containers and the interaction of containers within its domain 1505, and external of its domain 1506. (See detailed description referring to FIG. 11).

Figure 16:
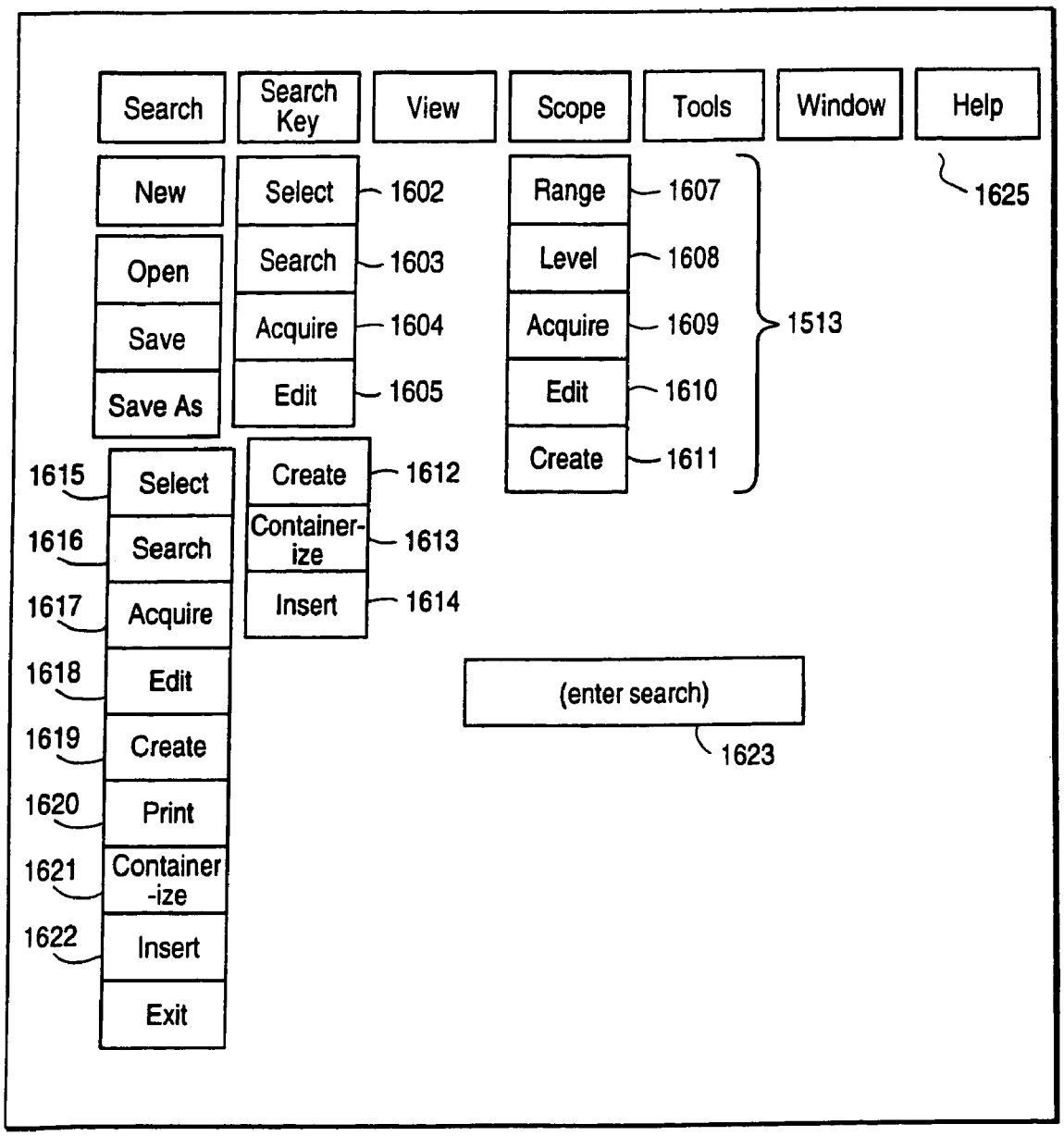
FIG. 16 is a drawing showing the screen interface of the search interface.

Referring now to FIG. 16, the screen interface of the search interface. This interface is a process wherein input is received by the user using the main menu 1625 or drop down menu 1624, or using an input device to "drag and drop" or click, or by entering text, causing the system 10 to select 1615, search for 1616, acquire 1617, edit 1618 create 1619, print 1620, containerize 1621 (by accessing the container editor 110) or insert 1622 digital search strings into the search box 1623 in order to submit that string to the search engine 320, or causing the system 10 to select 1602, search for 1603, acquire 1604, edit 1605, create 1612, containerize 1613 (by accessing the container editor 110), or insert 1614 search keys (templates that comprise search scope in geographic range, container level, and specific key words or digital strings), or containerized searches (containers 110), into the search box 1623 in order to submit that string to the search engine 320, or causing the system 10 to set a search range by geographic range 1607, container level 1608, or acquire 1609, edit 1610 or create 1611 a scope template. (templates that comprise search scope in geographic range and, container level.) (See detailed description referring to FIG. 6).

Figure 17:
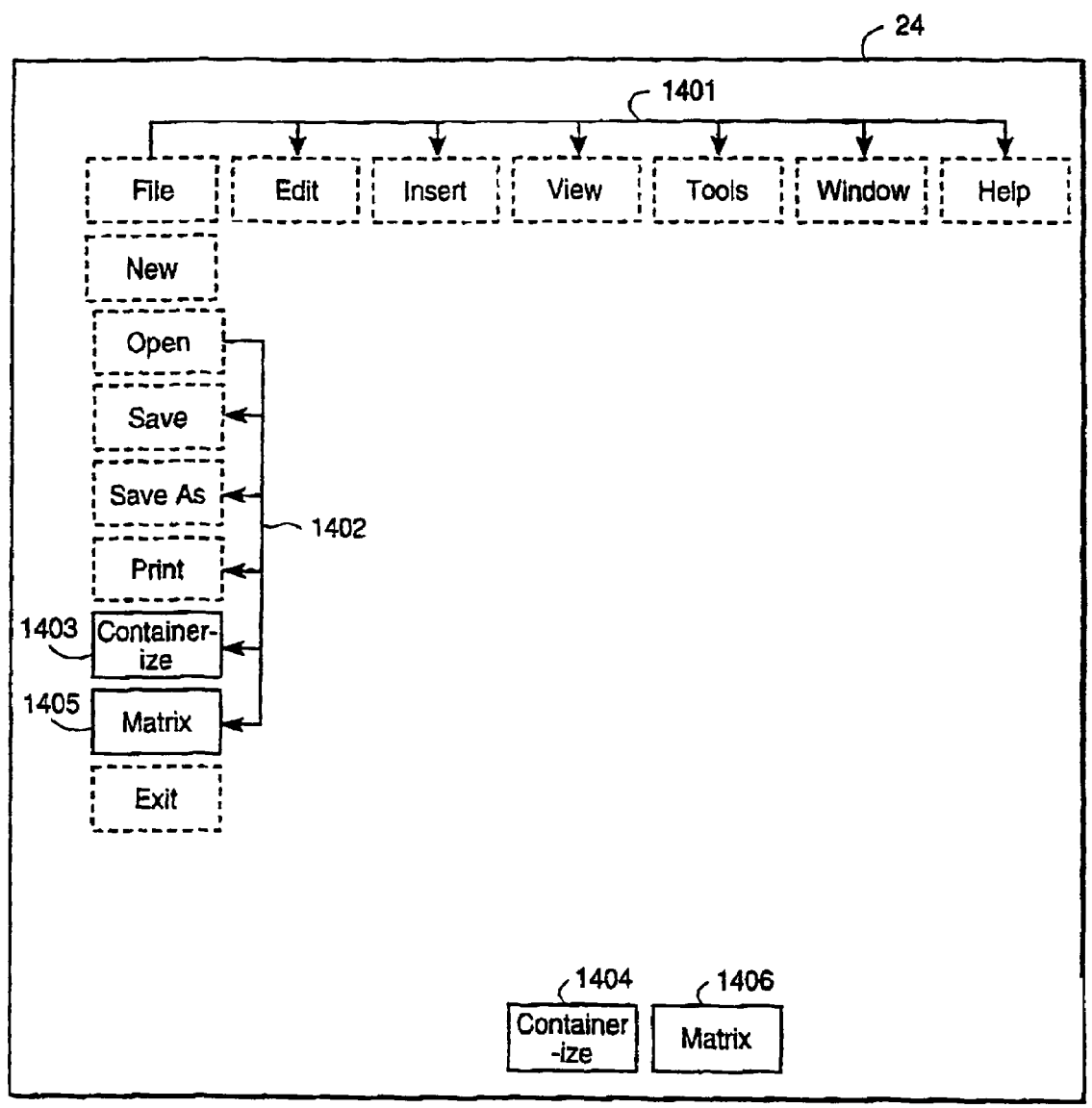
FIG. 17 is a drawing of a generic application program showing a drop-down menu link, and a button link to the containerization process or container editor.

Referring now to FIG. 17, a drawing showing, on an input device or computer screen 24, in any generic (dashed lines) software application program, a drop-down menu link 1403 on a drop down menu 1402 dropping down from a main menu 1401, and a free-floating button link 1404, is shown. When input is received at 1402 or 1403, the system 10 makes available to the user the containerization process or container editor 110. When input is received at drop-down menu link 1405 or a button link 1406, the system 10 makes available to the user the means to enter and interact with this system 10 or this network 201 in any of their aspects. The interfaces 1403, 1404 show a process wherein input is received causing the system 10 to encapsulate content or access the container editor 110. The link also allows the user to encapsulate the page or file on which he is currently working, without selecting content, and if so desired, without accessing the container editor. The interfaces 1405, 1406 show a process wherein input is received causing the system 10 to access or interact with the system 10 or the network 201.

The present invention also includes a search engine 320. Once the key word(s), phrase or digital segment is entered into the search interface 300, or an offered selection chosen on the menu, it is utilized by the search engine 320 to locate the desired site or data.

The search engine employed may be any industry standard search engine such as Verity "Topic", or Personal Library Software, as used in Dow Jones News Retrieval, or Internet search engines such as Webcrawler, Yahoo, Excite, Infoseek, Alexa or any Internet search engine, or any new engines to be developed capable of searching for and locating digital segments, whether text, audio, video or graphic.

The present invention also includes an analysis engine 400. Utilizing rules-based analysis, the analysis engine determines the class of storage medium upon which containers reside, the subsets and supersets by which and in which containers encompass and reside within one another, the routes of access to those containers, the historically successful search parameters by which those containers are accessed based upon the identity of the user accessing the containers, and the grade of access chosen by the user in accessing that container 100.

Utilizing a pre-programmed sequence of compilation, and inductive, deductive and derivative analysis, the analysis engine manufactures instructions based upon the analysis of the information submitted by the gateways and the search interface, and submits those instructions to the appropriate execution engine 500 in order to create new information containers, content assemblages, storage schemes, access routes, search templates, and gateway instructions, and others, and to provide informed search options through the search interface to the inquiring user.

The present invention also includes an engine editor 510, that provides a system administrator with a means of editing the operating principles of that search engine, and search template loading in the search interface 300, a reporting and collection means editor 610, 710, governing data reporting 600 and data collection 700 at the gateways 200 as defined by the gateway editor 210 and the register editor 125, a container editor 110 for creating and modifying containers and appending registers to containers, a register editor 125 for creating and modifying container registers and establishing and adjusting the values therein, container gateways 200 with their own storage 205, information containers 100 for holding information and container registers for holding information about specific containers and their history on the network.

The present invention also includes an execution engine 300. Based upon instructions received from the analysis engine 400 utilizing the communication device 26, the execution engine 500 provides search phrases to the search interface 300 based upon initially received inquiries, relocates containers including their programs, data and registers to other directories, drives, computers, networks on other classes of storage mediums, i.e., tape drive, optical drive, CD-ROM, deletes, copies, moves containers to nest within or encompass other containers on other directories, drives, computers, networks to nest within other containers, alters the class of storage medium upon which containers reside, the subsets and supersets by which and in which containers encompass and reside within one another, the routes of access to those containers, and the historically successful search parameters by which those containers are accessed based upon the identity of the user accessing the container and the grade of access chosen by the user in accessing that container.

The execution engine 400 fulfills the instructions of the analysis search engine 500, to create new information containers, content sub and superset assemblages, storage schemes, access routes, search templates, gateway 200 instructions and other system functions. The execution engine includes an editor 510 that provides a system manager with a means of editing the operating principles of that search engine, governing data reporting, data collection 700, search template loading, gateway instructions, and other functions.

The present invention also includes flat or relational databases 900, used where, and as required.

The present invention also includes a communication device 26 supporting all operations on a network wide basis.

The present invention also includes a search engine 300 to locate the desired site or data. The present invention also includes databases 900, flat or relational, to serve the other components of the system as needed and where needed.

The present invention also includes editors, by which the user may alter the governing aspects of the system. Editors include, but are not limited to, a container editor 110, a register editor 125, a gateway editor 210, an engine editor 510, a reporting means editor 610, a search interface 300, and a collection means editor 710.

The present invention also includes specific screen interfaces for the editors, as described in FIG. 14, FIG. 15. and FIG. 16.

The present invention also includes a means for this system 10 and network 201 or container editor 110 to be accessed from a menu or button selection within any program, as described in FIG. 17.

While the present invention has been described with reference to certain preferred embodiments, those skilled in the art will recognize that various modifications may be provided. For example, both analysis engine and execution engine may be duplicated or modified for distribution at various locations and hierarchical positions in the gateway and container system throughout the network and designed to work in concert. Also, the physical computing infrastructure may be mainframe, mini, client server or other with various network and distributed computing designs, including digitally supported or based physical or public media, and the components of the system 10, as described in FIG. 1 may be physically distributed through space. Even the contents of a single container may be logically referenced but be physically distributed through the network and reside at multiple storage locations. The whole system may be hierarchically nested within other systems to the nth degree. Whole systems may also be encapsulated within containers. A single container may also encompass a single physical media, such as a CD-ROM disk, programmed with the container, gateway and register design. Gateways may be strategically placed on containers at ingress and/or egress points or may be placed strategically throughout the system for optimal collection and reporting output and gateway system control. Also, the loop of gateway data collection and reporting, analysis engine analysis, instruction, and gateway modification, and execution engine operations may be infinitely nested, from the smallest container of two sub-containers to whole networks holding millions of containers and thousands of levels, with analysis itself nested within the multiple levels. Gateways may be established at both logical and physical junctures such as a satellite uplink point. Also, the provision to establish a unique network identity might be designed to include as of yet unknown computer networks as they arise. The analysis and execution engines may operate on a rules-based, fuzzy logic, artificial intelligence, neural net, or other system not yet devised. Other variations upon and modifications to the preferred embodiments are provided for by the present invention, which is limited only by the following claims. Also, the classification scheme of nested containers, while designated by the container creators, may transform, be utilized otherwise, or be wholly discarded according to usage. Also, hardware configurations, such as the use of RAM or hard drives for storage or lasers for communication may assume myriad forms without altering the essential operation of this invention.

What is claimed is:

1. A computer-implemented method comprising:
   receiving a search query;
   searching, using the computer, first container registers encapsulated and logically defined in a plurality of containers to identify identified containers responsive to the search query, the container registers having defined therein data comprising historical data associated with interactions of the identified containers with other containers from the plurality of containers, wherein searching the first container registers comprises searching the historical data; encapsulating the identified containers in a new container; updating second container registers of the identified containers with data associated with interactions of the identified containers with the new container; and
   providing a list characterizing the identified containers.

2. A computer-implemented method as in claim 1, when the received search query comprises a labeled data tree having at least one parent-child relationship.

3. A computer-implemented method as in claim 1, further comprising: providing information identifying containers that have previously been used to respond to one or more processed queries that are substantially similar to the search query.

4. A computer-implemented method as in claim 1, wherein the provided information is stored in one or more search templates.

5. A computer-implemented method as in claim 1, further comprising: providing information identifying substantially similar search phrases, search templates, or labeled data trees that have previously been used to respond to one or more processed queries that are substantially similar to the search query.

6. A computer-implemented method as in claim 5, further comprising:
   receiving a selection of one of the substantially similar search phrases; and
   providing a list of previously identified containers associated with the selected search phrase.

7. A computer-implemented method as in claim 1, wherein the list provides a title of each identified container and a short description of its contents.

8. A computer-implemented method as in claim 1, further comprising: receiving a container search level parameter; and wherein the searching content and container registers only searches within container levels associated with the container search level parameter.

9. A computer-implemented method as in claim 1, further comprising: receiving a container search level parameter; and wherein the list of identified containers only comprises containers associated with the container search level parameter.

10. A computer-implemented method as in claim 1, wherein the searching further comprises: encapsulating the search query into a search container.

11. A computer-implemented method as in claim 10, wherein the searching further comprises:
    receiving, by a gateway, the search container;
    storing, by the gateway, data contained within a register of the search container; and
    determining whether any registers of containers accessible via the gateway are associated with the register of the search container.

12. A computer-implemented method as in claim 11, further comprising:
    generating a new gateway; and
    associating the container with the new gateway.

13. A computer-implemented method as in claim 11, further comprising: periodically aggregating the contents of registers in a plurality of gateways to characterize a plurality of containers coupled thereto.

14. A computer-implemented method as in claim 11, wherein the contents of the registers in each of the plurality of gateways comprise at least one metric chosen from a group comprising: frequency of access of the gateway, grade of access of the gateway, description of users that have accessed the gateway, an identity of containers that have accessed the gateway, parameters associated with the gateway register, and historically accumulated register data.

15. A computer-implemented method as in claim 11, further comprising: monitoring transactions involving one or more gateways or containers.

16. A computer-implemented method as in claim 15, further comprising: generating new containers based on the monitored transactions.

17. A computer-implemented method as in claim 15, wherein the transactions are based on each instance a gateway or container passes through another gateway or container.

18. A computer-implemented method comprising:
receiving a search query;
polling, using the computer, a plurality of gateways to identify registers encapsulated therein, the gateways having a plurality of containers coupled thereto, the identified registers relating to identified containers logically defining data contained therein associated with the search query, the identified containers having container registers defined therein, the container registers containing data comprising historical data associated with interactions of the identified containers with other containers from the plurality of containers, wherein polling the plurality of gateways comprises searching the historical data;
encapsulating the identified containers in a new container;
updating the container registers of the identified containers with data associated with interactions of the identified containers with the new container; and
providing a list characterizing the identified containers.

19. A computer program product, tangibly embodied on computer-readable media, comprising instructions operable to cause a data processing apparatus to:
receive a search query;
search content and first container registers encapsulated and logically defined in a plurality of containers to identify identified containers associated with the search query, the first container registers having defined therein data comprising historical data associated with interactions of the identified containers with other containers from the plurality of containers, wherein searching the first container registers comprises searching the historical data;
encapsulate the identified containers in a new container;
update second container registers of the identified containers with data associated with interactions of the identified containers with the new container; and
provide a list characterizing the identified containers.

20. A computer program product, tangibly embodied on computer-readable media, comprising instructions operable to cause a data processing apparatus to:
receive a search query;
poll a plurality of gateways to identify registers encapsulated therein, the gateways having a plurality of containers coupled thereto, the identified registers relating to identified containers logically defining data contained therein associated with the search query, the identified containers having container registers defined therein, the container registers containing data comprising historical data associated with interactions of the identified containers with other containers from the plurality of containers, wherein polling the plurality of gateways comprises searching the historical data;
encapsulate the identified containers in a new container;
update container registers of the identified containers with data associated with interactions of the identified containers with the new container; and
provide a list characterizing the identified containers.

21. An apparatus comprising:
means for receiving a search query;
means for searching content and first container registers encapsulated and logically defined in a plurality of containers to identify identified containers associated with the search query, the first container registers having defined therein data comprising historical data associated with interactions of the identified containers with other containers from the plurality containers, wherein searching container registers comprises searching the historical data;
means for encapsulating the identified containers in a new container;
means for updating second container registers of the identified containers with data associated with interactions of the identified containers with the new container; and
means for providing a list characterizing the identified containers.

22. An apparatus comprising:
means for receiving a search query;
means for polling a plurality of gateways to identify identified registers encapsulated therein, the gateways having a plurality of containers coupled thereto, the identified registers relating to identified containers logically defining data contained therein associated with the search query, the identified containers having container registers defined therein, the container registers containing data comprising historical data associated with interactions of the one identified containers with other containers from the plurality of containers, wherein polling the plurality of gateways comprises searching the historical data;
means for encapsulating the identified containers in a new container;
means for updating the container registers of the identified containers with data associated with interactions of the identified containers with the new container; and
means for providing a list characterizing the identified containers.

23. A computer-implemented method comprising: receiving a search query;
Searching, using the computer, first container registers encapsulated and logically defined in a plurality of containers to identify search query templates encapsulated in identified containers, the first container registers having defined therein data comprising historical data associated with interactions of the identified containers with other containers from the plurality of containers, wherein searching container registers comprises searching the historical data;
encapsulating the identified containers in a new container;
updating second container registers of the identified containers with data associated with interactions of the identified containers with the new container; and
providing a list characterizing the identified one or more search query templates to formulate subsequent search queries.

* * * * *

UNITED STATES PATENT AND TRADEMARK OFFICE
CERTIFICATE OF CORRECTION

PATENT NO. : 7,702,682 B2 Page 1 of 1
APPLICATION NO. : 11/280700
DATED : April 20, 2010
INVENTOR(S) : Michael De Angelo It is certified that error appears in the above-identified patent and that said Letters Patent is hereby corrected as shown below:

IN THE SPECIFICATION

Column 18, line 22, replace the number 10 with --110--

Column 23, line 5, replace the number 1 with --11--

Signed and Sealed this

Twenty-ninth Day of June, 2010

David J. Kappos
*Director of the United States Patent and Trademark Office*